(12) United States Patent
Kikuchi et al.

(10) Patent No.: US 7,010,032 B1
(45) Date of Patent: Mar. 7, 2006

(54) MOVING IMAGE CODING APPARATUS AND DECODING APPARATUS

(75) Inventors: Yoshihiro Kikuchi, Kanagawa (JP); Tadaaki Masuda, Tokyo (JP); Takeshi Nagai, Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/522,950

(22) Filed: Mar. 10, 2000

(30) Foreign Application Priority Data

Mar. 12, 1999 (JP) ............................. P.11-067120
Sep. 6, 1999 (JP) ............................. P.11-251929

(51) Int. Cl.
*H04N 7/12* (2006.01)

(52) U.S. Cl. .............................................. 375/240.01
(58) Field of Classification Search .......... 375/240.01, 375/240.27, 240.12, 845.1; 386/68, 101, 386/125; 370/468, 487, 537; 348/423.1; H04N 7/44, H04N 7/12
See application file for complete search history.

(56) References Cited

U.S. PATENT DOCUMENTS

| | | | |
|---|---|---|---|
| 5,990,955 A * | 11/1999 | Koz ...................... | 375/240.01 |
| 5,995,707 A * | 11/1999 | Lee .............................. | 386/81 |
| 6,229,951 B1 * | 5/2001 | Schultz et al. ................ | 386/68 |
| 6,404,817 B1 * | 6/2002 | Saha et al. ............. | 375/240.27 |
| 6,542,518 B1 * | 4/2003 | Miyazawa .................. | 370/468 |

* cited by examiner

*Primary Examiner*—Nhon Diep
(74) *Attorney, Agent, or Firm*—Oblon, Spivak, McClelland, Maier & Neustadt, P.C.

(57) ABSTRACT

A moving image coding apparatus which has coders (17, 18, 19) for dividing an input moving image signal into a plurality of frames, dividing each of the frames into one or more image areas, compressing and coding the image areas, and outputting an area image code string, a system multiplexer (20) for separating frame header information indicating the coding mode, etc., of the frame frame from the frame frame and adding the frame header information to one or more coded area image code strings, and a sender (25) for collecting one or more area image code strings to which the frame header information is added, adding packet header information, putting into a packet, and sending the packet.

21 Claims, 21 Drawing Sheets

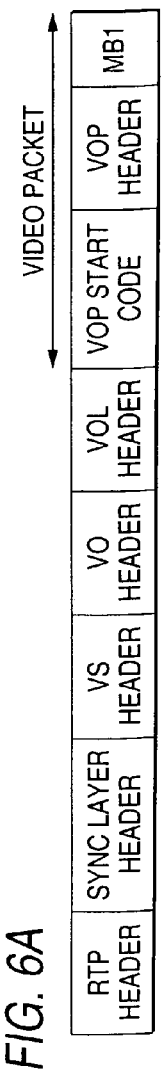
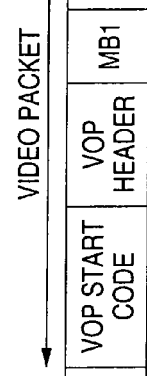
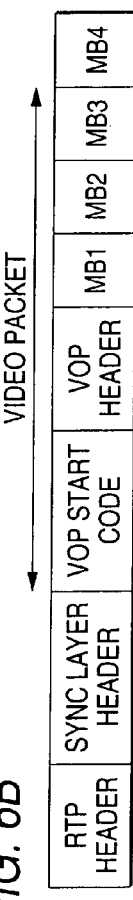
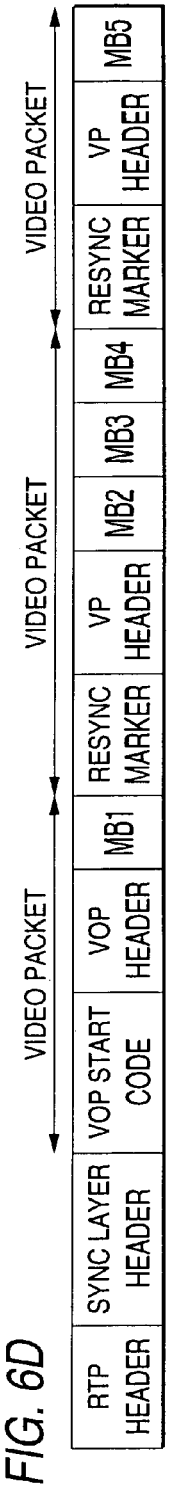
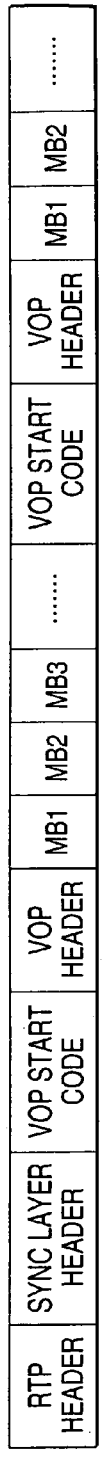
FIG. 6A
FIG. 6B
FIG. 6C
FIG. 6D
FIG. 6E

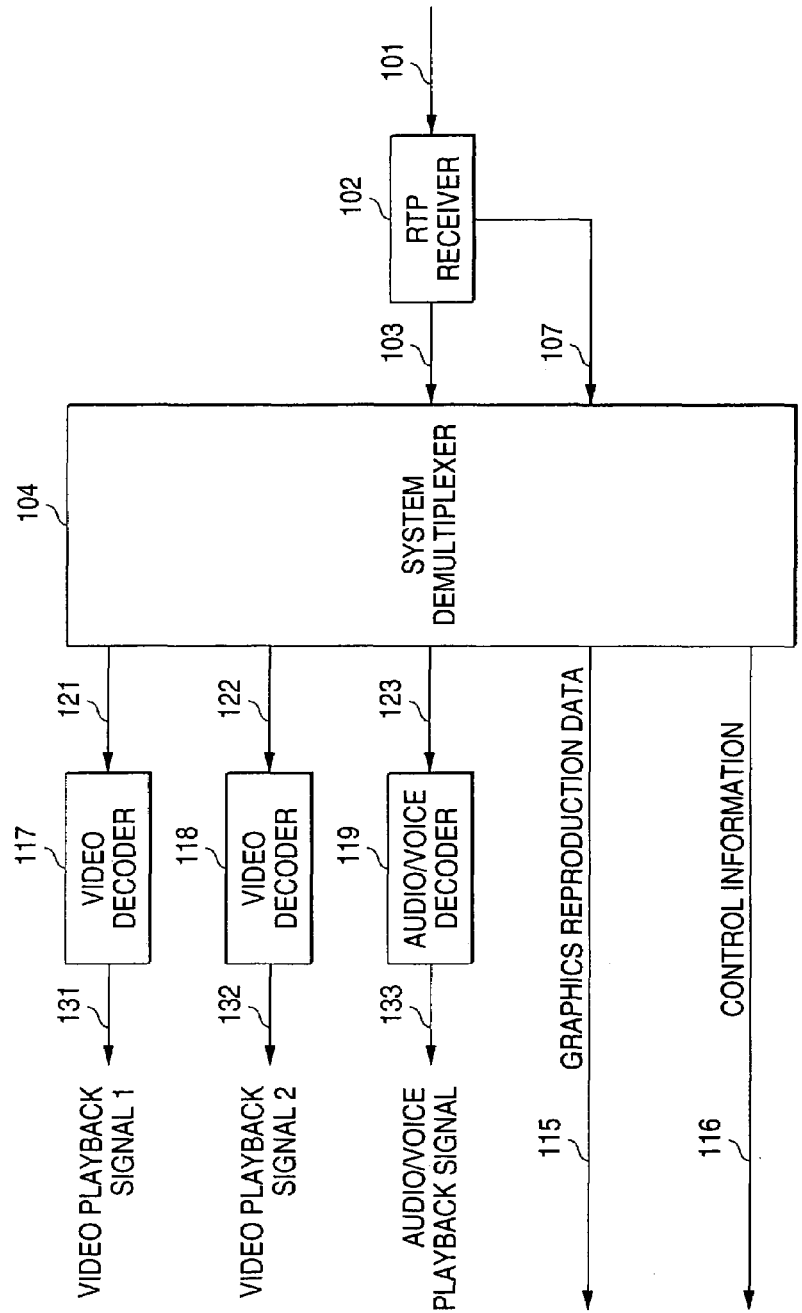

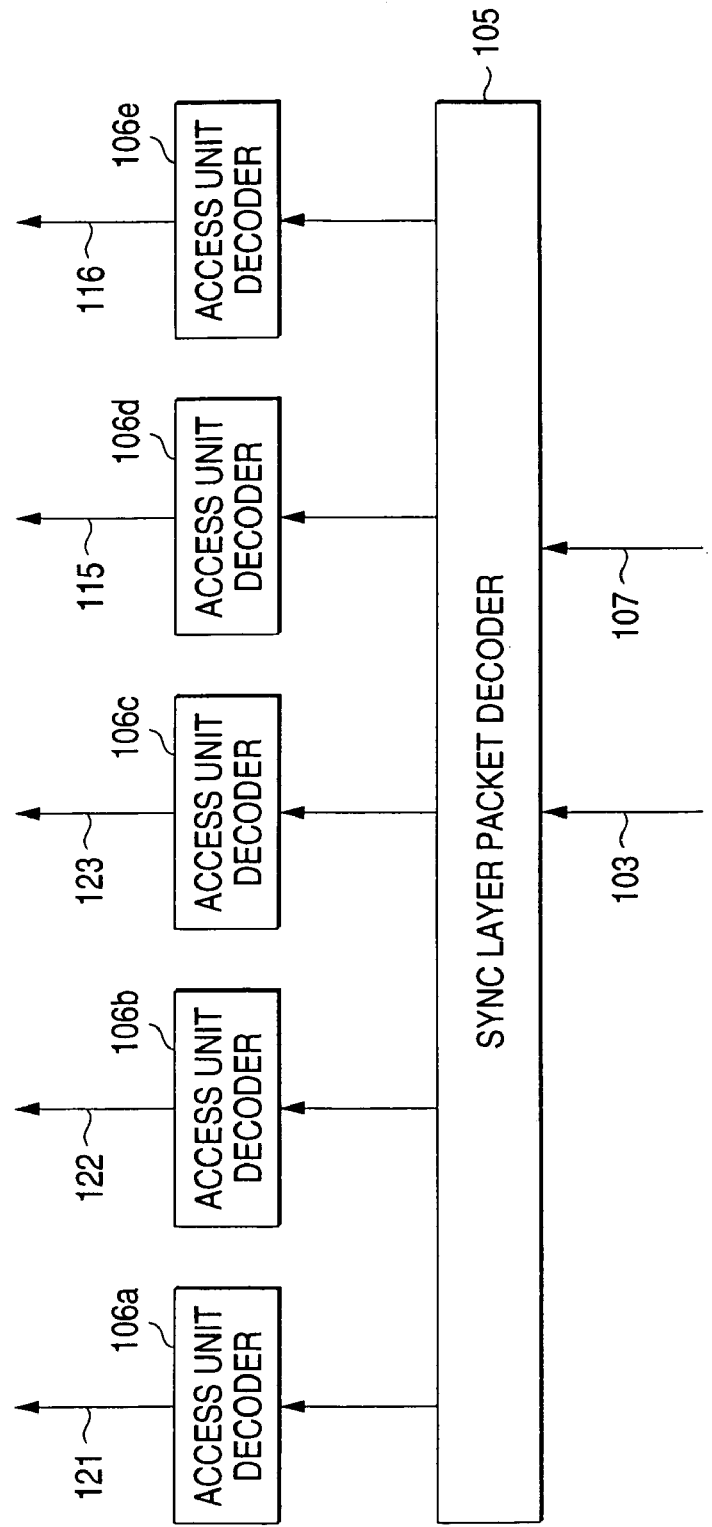

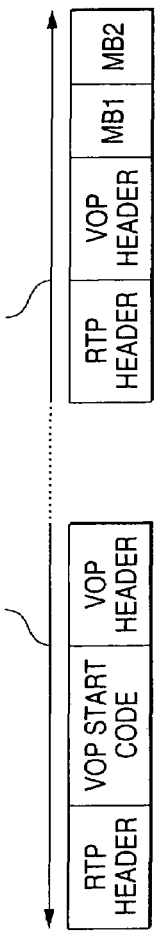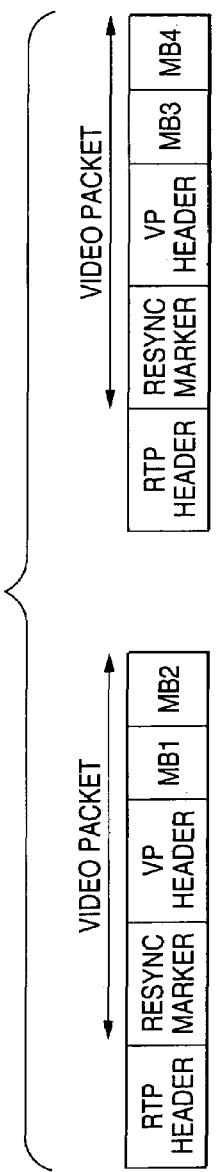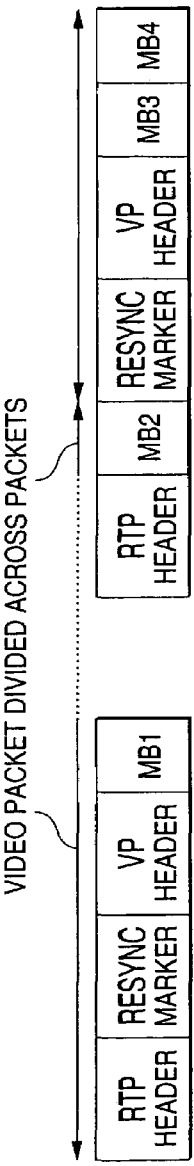

MOVING IMAGE CODING APPARATUS AND DECODING APPARATUS

DETAILED DESCRIPTION OF THE INVENTION

1. Field of the Invention

This invention relates to a moving image coding apparatus and a moving image decoding apparatus used with a system for compressing, coding, and multiplexing an image and voice and transmitting them via a network and particularly used with a system for transmitting a compressed image and voice on a packet-based network such as an intranet or the Internet.

2. Description of the Related Art

In video telephones, videoconference systems, digital television broadcasting, etc., a technique for compressing and coding a moving image and voice to less information amounts, multiplexing compressed moving image code string, voice code string, and data code string into one code string, and transmitting and storing the code string is used.

Techniques of motion compensation, discrete cosine transform (DCT), sub-band coding, pyramid coding, variable-length coding, etc., and systems provided by combining the techniques are developed. ISO MPEG1 and MPEG2 and ITU-T H.261, H.262, and H.263 exist as international standards for compressing and coding moving images, and ISO MPEG system, ITU-T H.221, H223, and the like exist as international standards for multiplexing code strings provided by compressing moving images and voice and audio signals and any other data. They are described in detail in document 1, "Multimedia coding no kokusaihyoujyun" edited and written by YASUDA Hiroshi, Maruzen (1994) and document 2, "MEPG-4 no subete" edited and written by MIKI, Kougyou chousakai (September 1998), and the like.

On the other hand, RTP (Realtime Transport Protocol) exists as a protocol for executing real-time transmission of a moving image code string provided by compressing and coding a moving image on a packet-based network such as an intranet or the Internet. The RTP is described in detail in document 3, Schulzrinne, Casner, Frederick, Jacobson RTP, "A Transport Protocol for Real Time Applications," RFC 1889, Internet Engineering Task Force (January 1996), and the like.

In addition to a fixed RTP header used in common, an RTP header proper to the compressing and coding technology can also be used as an RTP packet header. For example, the RTP headers for MPEG-1 and MPEG-2 are defined in document 4, D. Hoffman, G. Fernando, V. Goyal, M. Civanlar, "RTP Payload format for MPEG1/MEGP2 video," RFC 2250, Internet Engineering Task Force (January 1998).

Document 4 defines an RTP format for transmitting a previously-multiplexed packet using an MPEG system and an RTP format proper to video/audio for entering a coded video/audio bit stream directly in an RTP packet.

In the former RTP format, one or more transport stream (TS) packets in an MPEG2 system in an RTP packet intact. Thus, if a transmission line error such as a packet loss occurs on a transmission line or medium for transmitting an RTP packet, it is made impossible to decode not only the lost RTP packet, but also the video bit stream in any other RTP packet to be decoded using the header information of the video bit stream contained in the lost RTP packet. Consequently, the transmission line error causes large degradation to occur in the decoded video signal; this is a problem.

On the other hand, as the latter RTP format, an RTP format extended for an MPEG video bit stream is used. FIG. 16 shows an example of the extended RTP format proper to MPEG video. In FIG. 16, $f\_[0,0]$, $f\_[0,1]$, $f\_[1,0]$, $f\_[1,1]$, DC, PS, T, P, C, Q, V, A, R, etc., is the same as information contained in a picture header in an MPEG video bit stream. Thus, the information contained in the picture header in the video bit stream is also entered in an RTP header of any other RTP packet than the RTP packet in which the picture header is entered, whereby if the RTP packet in which the picture header is entered is lost, in any other RTP packet, the information contained in the RTP header can be used for video decoding.

However, the extended RTP format involves the following problems:

(1) To prepare and transmit an RTP packet in a coding apparatus, processing of entering the header information contained in a video code string in an RTP packet header must be performed. After the RTP packet is received in a decoding apparatus, the information contained in the RTP header must be decoded and passed to a video decoding apparatus. The operation amounts increase because the steps are involved.

(2) The advantage of the extended RTP format can be provided on a network capable of transmitting RTP packets, such as an intranet or the Internet, but cannot be provided on a network incapable of transmitting RTP packets, such as a circuit switching network, since video code strings must be transmitted using any other multiplexing system other than the RTP.

As described above, to transmit packets undergoing system multiplexing in RTP packets in the coding apparatus for coding a moving image signal and transmitting the coded signal using an RTP packet, when the RTP packet containing important information such as the header information on a video bit stream is lost, this error also affects other RTP packets, causing large degradation to occur in the decoded moving image signal.

To use the RTP format proper to video coding, processing for entering the header information contained in a video code string in an RTP header becomes intricate. To connect a network capable of transmitting RTP packets also to a network incapable of transmitting RTP packets for transmitting a video code string, the advantage of the RTP extended header cannot be provided.

SUMMARY OF THE INVENTION

The invention has been made to solve the above problem, and therefore an object of the invention is to provide a moving image coding apparatus and a moving image decoding apparatus for suppressing the adverse effect of an RTP packet loss when a moving image signal is coded and is transmitted using an RTP packet and simplifying processing of entering header information in an RTP header.

According to the invention, there is provided a moving image coding apparatus comprising coding means for dividing an input moving image signal into a plurality of screens (frames), dividing each of the screens (frames) into one or more image areas, compressing and coding the image areas, and outputting an area image code string, means for separating screen (frame) header information indicating the coding mode, etc., of the screen (frame) from the screen and adding the screen (frame) header information to one or more coded area image code strings, and conversion-to-packet means for collecting one or more area image code strings to which the screen header information is added, adding packet header information, putting into a packet, and sending the packet.

According to the invention, there is provided a moving image decoding apparatus comprising reception means for receiving a moving image code string put into a packet, separation means for separating one or more area image code strings contained in each packet of the moving image code string, area image decoding means for decoding the separated area image code string and outputting a decoded area image signal, screen decoding means for assembling the decoded area image signal for each screen (image frame) and outputting a decoded screen signal (decoded image frame signal), and means for generating a decoded moving image signal based on the decoded screen signal.

BRIEF DESCRIPTION OF THE DRAWINGS

In the accompanying drawings:

FIGS. 6A to 6E are drawings to show the relationships among RTP-packet, sync layer packet, and video bit stream;

FIG. 7 is a block diagram of a decoding apparatus corresponding to the coding apparatus in FIG. 1;

FIG. 8 is a block diagram to show the configuration of a system demultiplexer;

FIGS. 17A to 17C are drawings to show examples of RTP packet division prohibited according to RTP packet division rules;

DETAILED DESCRIPTION OF THE PREFERRED EMBODIMENTS

Referring now to the accompanying drawings, there are shown preferred embodiments of the invention.

First Embodiment

Figure 1:
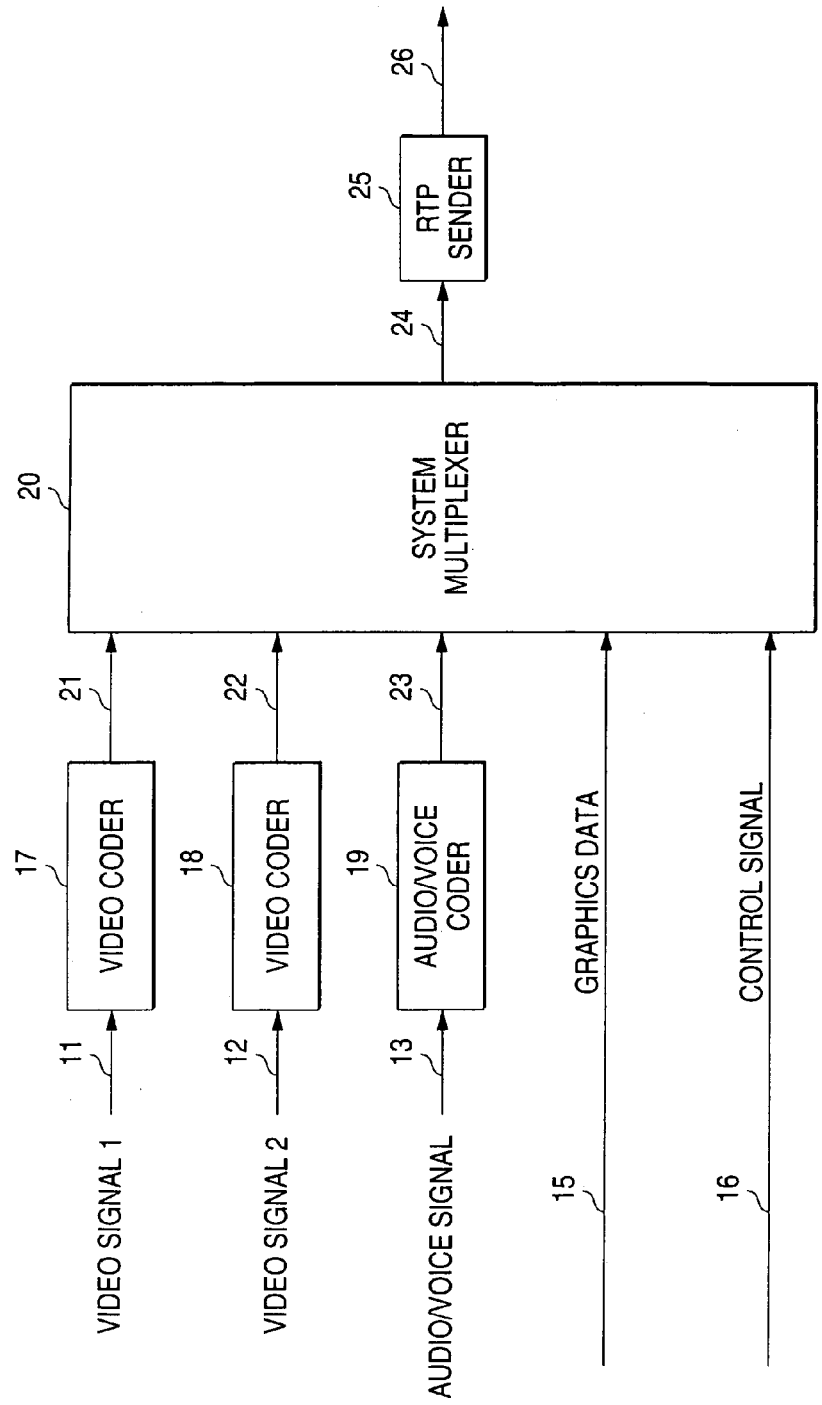
FIG. 1 is a block diagram of a coding apparatus according to a first embodiment of the invention.

FIG. 1 shows the configuration of a coding apparatus according to a first embodiment of the invention. Video signals 11 and 12 and an audio/voice signal 13 input from input means for inputting a moving image, such as a camera or a videocassette recorder (VCR), and converted into digital signals are input to video coders 17 and 18 and an audio/voice coder 19 respectively. Graphics data 15 and a control signal 16 for performing control are input to a system multiplexer 20.

The video signals 11 and 12 are compressed and coded by the first and second video coders 17 and 18 and are input to the system multiplexer 20 as first and second video code strings 21 and 22. The audio/voice signal 13 is compressed and coded by the audio/voice coder 19 and is input to the system multiplexer 20 as an audio/voice code string 23.

The video code strings 21 and 22, the audio/voice code string 23, the graphics data 15, and the control signal 16 are multiplexed by the system multiplexer 20 to generate a system code string 24. An RTP sender 25 puts the system code string 24 into an RTP packet and sends it as an RTP packet 26.

The video coders 17 and 18 performs highly efficient compression coding of a moving image signal by using DCT, quantization, variable-length coding, inverse quantization, inverse DCT, motion compensation, etc. That is, the moving image signal is divided into a plurality of frames, for example, frames and each frame is divided into one or more image areas, namely, blocks. The blocks are compressed and coded in accordance with a coding mode such as an intra-coding mode or an interceding mode to prepare a block coding string (image area coding string). Such processing is described in detail in document 2, etc., and therefore only the topics related to the invention will be discussed.

The number of video signals and that of video coders may be one or may be two or more as in the example in FIG. 1. To code a plurality of video signals, for example, before a moving image signal is coded, it can also be divided into a plurality of video objects such as a human figure and a background for inputting and coding the objects separately.

Figure 2:
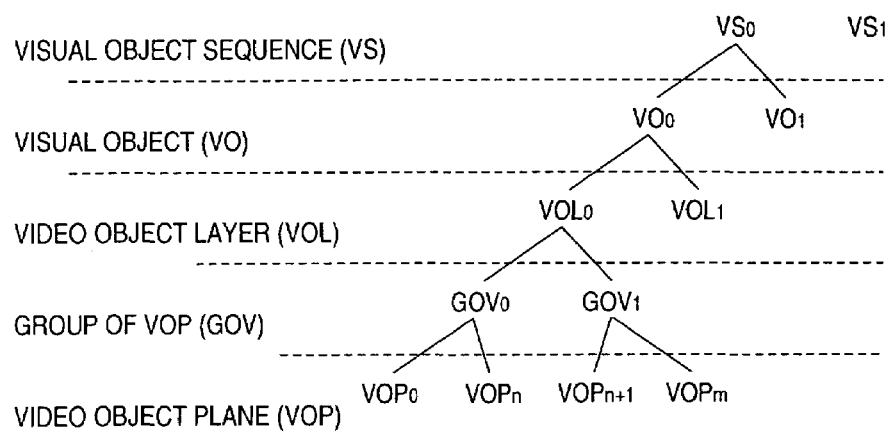
FIG. 2 is a drawing to show the hierarchical structure of a video code string.

To handle such video objects, video bit stream has a hierarchical structure as shown in FIG. 2. The layer corresponding to the general sequence of a moving image is called VS (Visual Object Sequence) and one or more VOs (Visual Objects) exist in the VS. For example, if a human figure exists in a background, successive motion of only the human figure can be described as one VO, and a sequence of only the background can also be described individually. Further, each VO has a layer called VOL (Video Object Layer) under the VO. The VOL is a layer for giving a plurality of spatial resolutions or temporal resolutions to the VO; it is provided for performing spatio/temporal scalability coding. VOP (Video Object plane) at the lowest layer corresponds to a conventional frame and means data at "one instant" in each resolution of each VO (snap shot). A layer called GOV (Group of VOP) containing time information, etc., for executing random access exists between the VOL and VOP as an option.

Figures 3A, 3B, 3C, 3D:
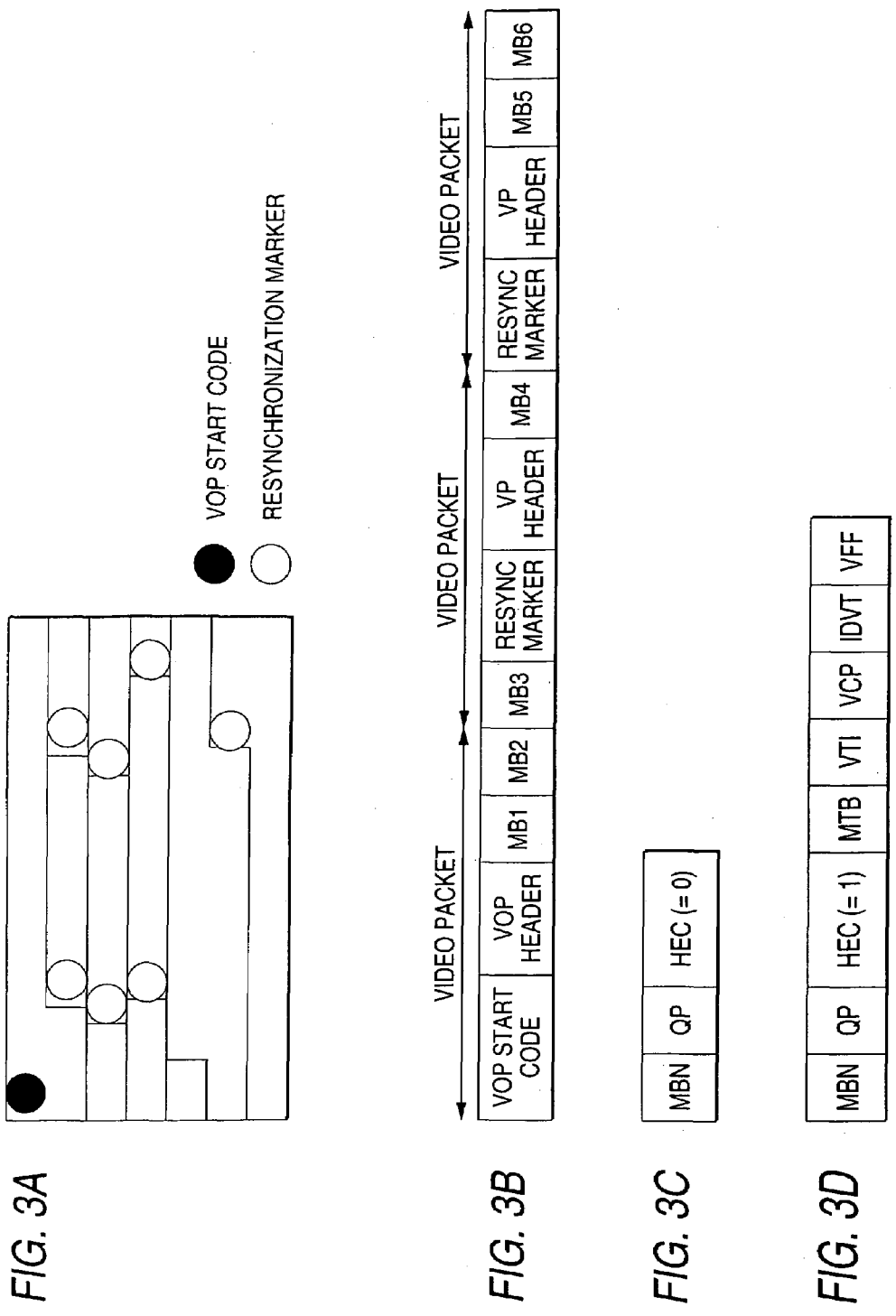
FIGS. 3A to 3D are drawings to describe video packets.

If a code string is sent via a transmission line or medium where a bit error or a packet loss occurs, the following mechanism is adopted for video coding in order to reduce the adverse effect of the error:

As shown in FIG. 3A, the VOP is separated into units called video packets each consisting of several macro blocks (MBs). A marker for recovering synchronization (RM: Resynchronization marker) is added to the top of each video packet of a video code string, as shown in FIG. 3B.

FIGS. 3C and 3D are drawings to show header information of the video packet (VP header in FIG. 3B). The video packet header contains a flag called HEC (Header Extension Code). If the flag is "1," information of time code (MTB, VTI), VOP coding mode (VCP), intra DC VLC table change information (intra DC VLC threshold, IDVT), motion vector range information (VOP F code forward, VFF), etc., contained in the VOP header is also added to the video packet header, as shown in FIG. 3D.

Figure 4:
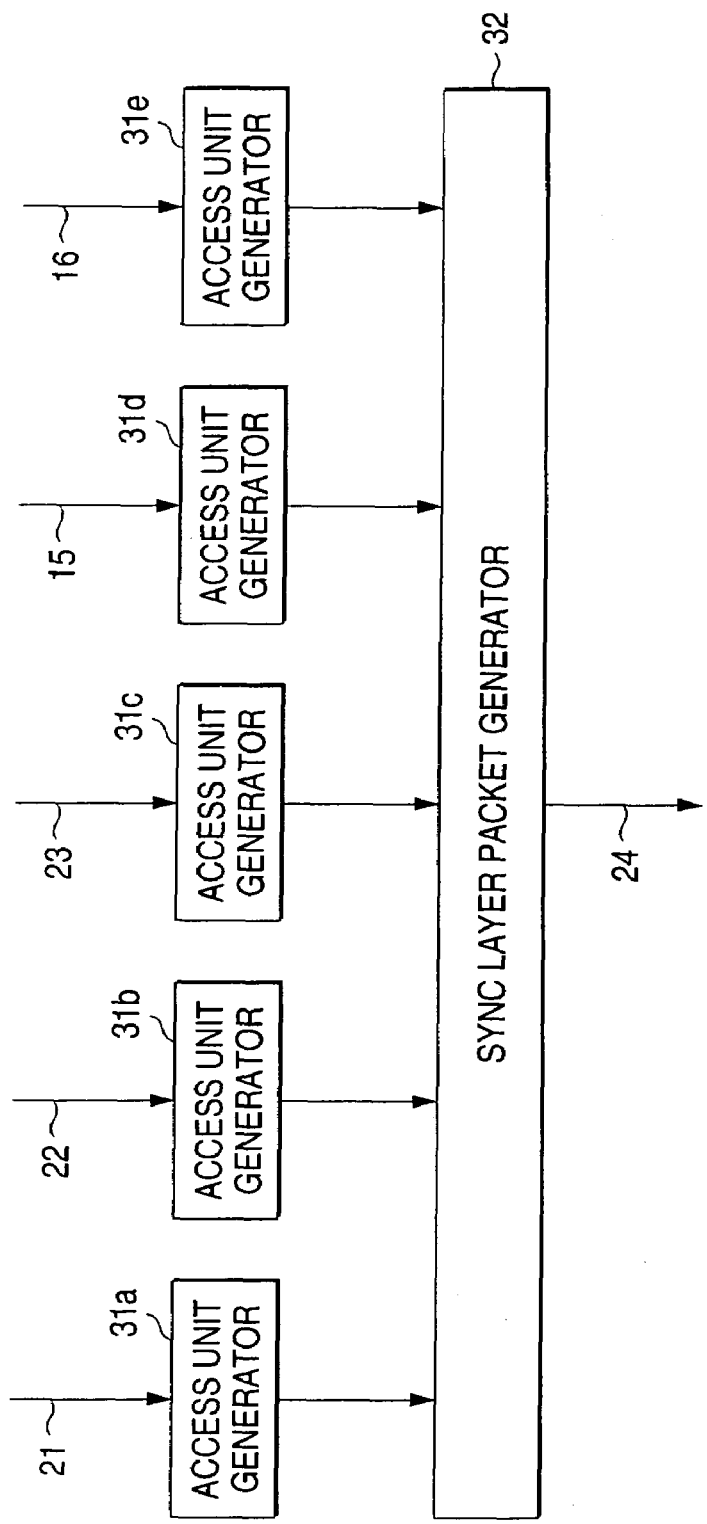
FIG. 4 is a block diagram to show the configuration of a system multiplexer.

FIG. 4 shows the configuration of the system multiplexer 20. The system multiplexer 20 is made up of access unit generators 31a to 31e and a sync layer packet (SL-PDU) generator 32. The access unit generators 31a to 31e separate input code strings 21, 22, 23, 15, and 16 into predetermined units called access units. For example, the video code string may be separated into access units in VOP units. The number, time stamp, and the like for identifying the code string are added to each access unit.

The access units are input to the sync layer packet generator 32, which then generates sync layer packets (also called SL-PDU) as a system code string 24. For the sync layer packets, the access units may be used intact or the access units may be divided into further fine units. The system code string 24 consisting of the generated sync layer packets is sent to the RTP sender 25 in FIG. 1, which then generates an RTP packet 26.

Figure 5:
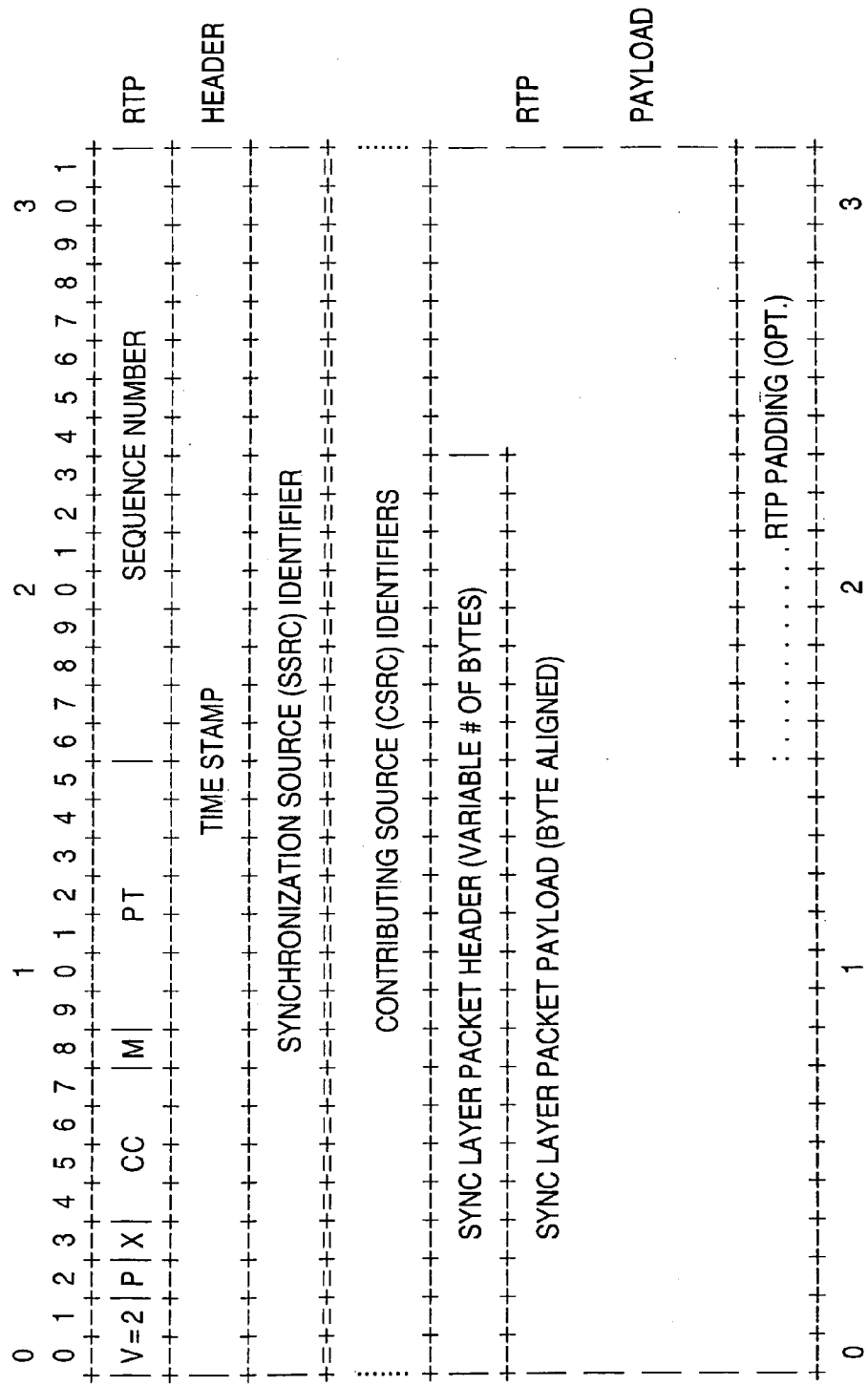
FIG. 5 is a drawing to show the formats of an RTP packet header and payload.

FIG. 5 shows an example of the generated RTP packet 26. It shows the RTP packet separated every 32 bits; 00 to 31 on the horizontal axis indicate bit positions of the RTP packet separated every 32 bits. In the figure, fields of V, P, X, . . . CSRC shown as RTP Header provide the RTP header (RTP fixed header). This topic is described in detail in document 3 and therefore will not be discussed again in detail.

The sync layer packet generated by the sync layer packet generator 32 is entered in RTP payload in FIG. 5. In the RTP payload, first a sync layer packet header (SL-PDU header) is placed, followed by sync layer packet payload (SL-PDU payload), the contents of the sync layer packet. If the number of bits of the RTP payload is not a multiple of 32, a bit string called RTP padding may be added to the end of the RTP payload so that the number of bits of the RTP packet becomes a multiple of 32.

For some information in the RTP header, the information contained in the sync layer packet header may be used intact. For example, time stamp information in the sync layer packet header may be used as time stamp information in the RTP header. In this case, the time stamp may be removed from the sync layer packet header.

The access unit generators 31a to 31e and the sync layer packet generator 32 divide the video code string based on the following rules:

(1-1) Each header above the GOV in the hierarchical structure in FIG. 2 must be placed at the top of the sync layer packet payload (just after the sync layer packet header) or just after the higher-layer header;

(1-2) a higher-layer header than the header placed at the top of the sync layer packet payload must not exist at an intermediate point of the payload;

(1-3) if one or more heads exist in the sync layer packet payload, the payload must always begin with the header; and (1-4) header must not be divided across sync layer packets.

FIGS. 6A to 6E are drawings to show examples of RTP packets generated as a result of generating sync layer packets based on the rules.

FIG. 6A shows the RTP packet in the beginning portion of a video bit stream sequence. According to rule (1-1), the VS (Visual Object Sequence) header, the VO (Visual Object) header, and the VOL (Video Object Layer) header above the GOV are successively placed just after the sync layer packet header. If the VS header, the VO header, or the VOL header, which has a small code amount, is divided across sync layer packets, RTP packets, code amount overhead caused by the RTP head or the sync layer packet header grows and the code amount increases. The header information pieces are entered in one RTP packet as shown in FIG. 6A, whereby the overhead caused by the RTP header or the sync layer packet header is reduced and an increase in the code amount is suppressed.

FIGS. 6B and 6C show examples of entering one video packet in one RTP packet. When the packet loss rate of the transmission line for sending a code string is high, if each video packet is entered in one sync layer packet, RTP packet, even if a packet loss occurs, only one video packet is lost, so that error resilience is improved. As previously described with reference to FIG. 3D, if video coding is performed so that a part of the VOP header information is entered in the video packet header, the information can be used to decode a moving image if the RTP packet containing the VOP header is lost. In the example, the access unit generators 31a to 31e may divide access units for each VOP and further the sync layer packet generator 32 may divide sync layer packets for each video packet.

FIG. 6D shows an example of entering a plurality of video packets in one RTP packet. If too fine division into RTP packet is executed, overhead caused by the RTP header or the sync layer packet header grows. Thus, if the bit rate of the transmission line is low, a plurality of video packets may be thus entered in one RTP packet.

FIG. 6E shows an example of entering a plurality of VOPs in one RTP packet. In doing so, the overhead caused by the RTP head, the SL-PDU header can be reduced more than that in FIG. 6D.

Padding bits may be added the end of each RTP packet in FIGS. 6A to 6E so that the RTP packet length becomes a multiple of 32 bits.

FIG. 7 is a block diagram to show the configuration of a decoding apparatus corresponding to the coding apparatus in FIG. 1. A code string 101 sent via a transmission line or a storage medium (not shown) is input to an RTP receiver 102. The RTP receiver 102 decodes the time stamp, the sequence number, etc., in the RTP packet header and outputs a sync layer packet 103 to a system demultiplexer 104.

If the RTP sender 25 removes some information of the time stamp, etc., in the sync layer packet header and enters the remaining information in the RTP header in, the RTP receiver 102 restores the removed sync layer packet header information to the original based on the decoded time stamp from the RTP header.

If a packet loss of RTP packet or reversal of the packet arrival order occurs on the transmission line, the received RTP packet sequence numbers do not become serial or are reversed, thus the packet loss, etc., can be detected. The RTP receiver 102 may restore the reversed RTP packet order to the correct order or feed back the detected packet loss rate, etc., to the coder as RTCP information (not shown).

FIG. 8 is a block diagram to show the configuration of the system demultiplexer 104. First, a sync layer packet decoder 105 decodes an access unit based on the sync layer packet header information in the input sync layer packet 103. If the sync layer packet generator 32 divides one access unit into a plurality of sync layer packets, a sync layer packet decoder 105 assembles the sync layer packets into one original access unit. The generated access units are classified according to the type (video, audio/voice, graphics, control signal) and are output to corresponding access unit decoders 106a to 106e. The access unit decoders 106a to 106e decode the access unit headers and output first and second video code strings 121 and 122, an audio/voice code string 123, graphics data 115, and a control signal 116.

First and second video decoders 117 and 118 and an audio/voice decoder 119 decode the video code strings 121 and 122 and the audio/voice code string 123 respectively and output first and second video reconstruction signals 131 and 132 and an audio/voice reconstruction signal 133 respectively as reconstruction signals.

If the RTP receiver 102 detects a packet loss of RTP packet, it may send a signal 107 indicating occurrence of a packet loss to the system demultiplexer 104. The system demultiplexer 104 may input the signal 107 to the sync layer packet decoder 105 and for the packet where the packet loss occurred, a signal indicating occurrence of the packet loss (not shown) may be sent to the access unit decoders 106a to 106e instead of sending the access unit. Each of the access unit decoders 106a to 106e may send a signal indicating occurrence of the packet loss (not shown) to the video decoder 117 or the audio/voice decoder 119 based on the signal 107.

The video decoder 117 may perform the following decoding processing based on the sent signal indicating occurrence of the packet loss: For example, assume that video code string is divided for each video packet and RTP packet is generated, as shown in FIGS. 6B and 6C. Also, assume that the video packet header of the video packet in FIG. 6C contains some information of the VOP header as previously described with reference to FIG. 3C. If occurrence of packet loss in the RTP packet containing the VOP header in FIG. 6B is detected, to decode the video packet in the RTP packet in FIG. 6C, the video packet is decoded based on the information of the VOP header contained in the video packet header in place of the VOP header information. In doing so, if the RTP packet containing the VOP header is lost, the video code string contained in any other RTP packet can be decoded correctly.

According to the embodiment, VOP header information is added in the corresponding video coder 17 or 18 or the audio/voice coder 19 to the VOP header in FIG. 3 and is multiplexed in the system multiplexer 20. The packet header information is added to image code string in the RTP sender 25.

Second Embodiment

Figure 9:
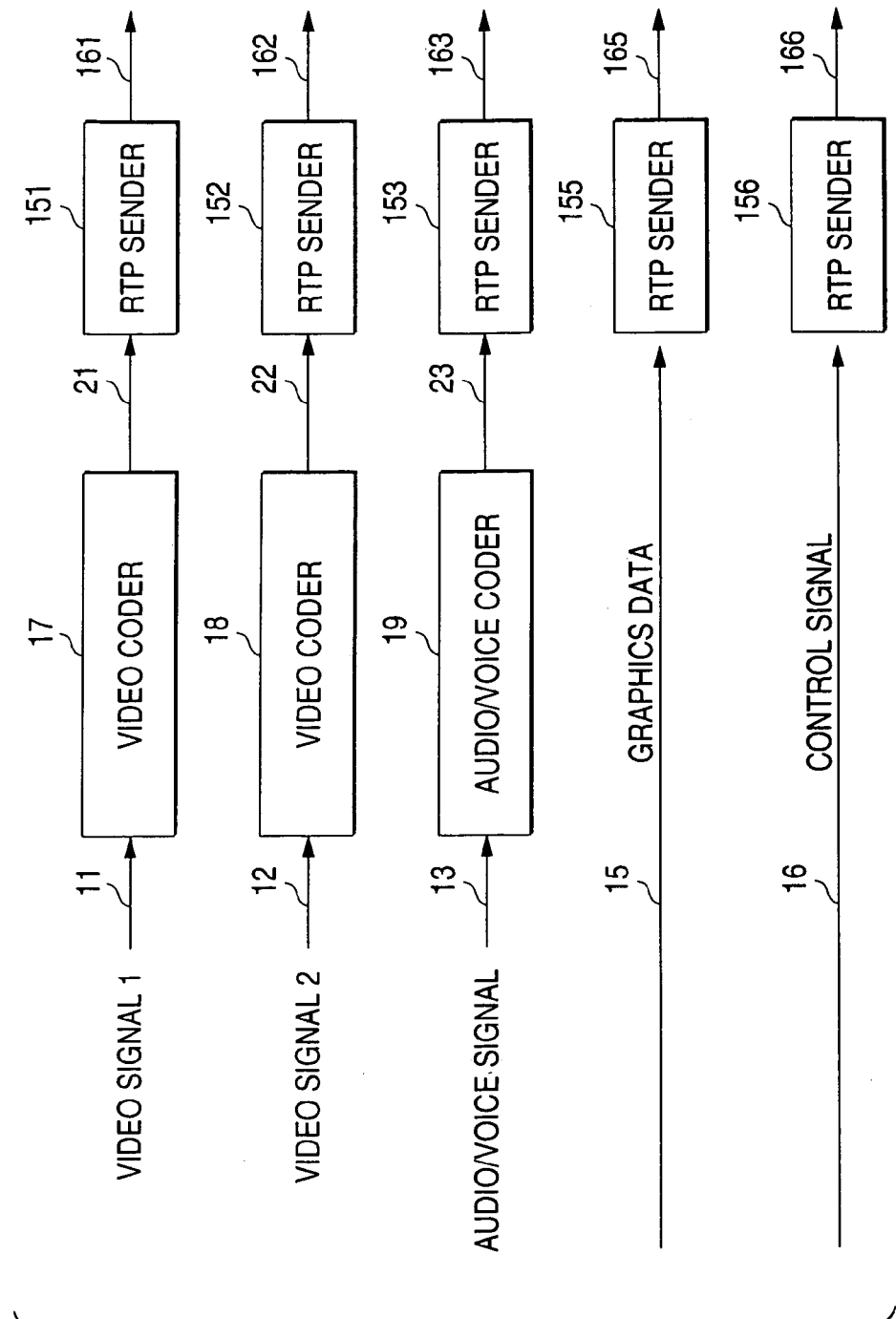
FIG. 9 is a block diagram of a coding apparatus according to a second embodiment of the invention.

FIG. 9 shows the configuration of a coding apparatus according to a second embodiment of the invention. Parts identical with those previously described with reference to FIG. 1 are denoted by the same reference numerals in FIG. 9 and only the differences from the coding apparatus of the first embodiment will be discussed. The coding apparatus of the second embodiment differs from that of the first embodiment in that it does not include the system multiplexer in the first embodiment, that first and second code strings 21 and 22, an audio/voice code string 23, graphics data 15, and a control signal 16 are input to RTP senders 151, 152, 153, 154, 155, and 156, and that RTP packets 161, 162, 163, 164, 165, and 166 are also output separately. The RTP packets are multiplexed on an IP packet layer (not shown).

Figure 10:
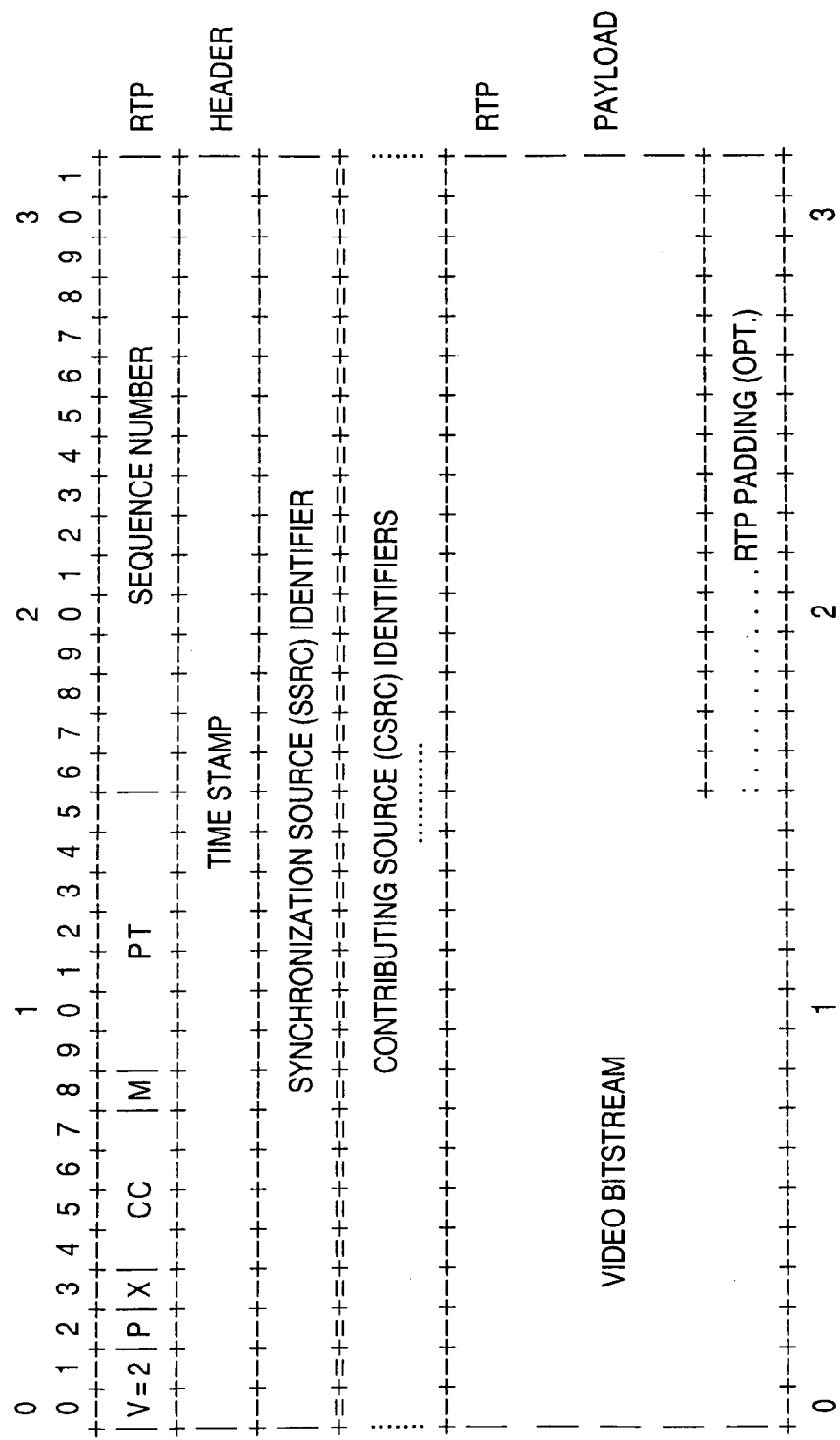
FIG. 10 is a drawing to show the format of a video RTP packet.

FIG. 10 shows an example of an RTP packet corresponding to a video code string. The RTP header fields are given the same names as the information pieces contained in the RTP header of the RTP packet in FIG. 5, but they differ partially in meaning.

A partial code string provided by dividing the video code string is entered in RTP payload in FIG. 10. The video code string is divided based on the following rules:

(2-1) Each header above the GOV in the hierarchical structure in FIG. 2 must be placed at the top of the RTP payload (just after the RTP header) or just after the higher-layer header;

(2-2) a higher-layer header than the header placed at the top of the RTP payload must not exist at an intermediate point of the payload;

(2-3) if one or more heads exist in the RTP payload, the payload must always begin with the header; and (2-4) video header must not be divided across RTP packets.

Figure 11A:
FIGS. 11A to 11E are drawings to show the relationship between RTP packet and video bit stream.

FIGS. 11A to 11E are drawings to show examples of RTP packets generated by dividing a video bit stream based on the rules (2-1) to (2-4). FIG. 11A shows the RTP packet in the beginning portion of the video bit stream sequence. According to rule (2-1), the VS (Visual Object Sequence) header, the VO (Visual Object) header, and the VOL (Video Object Layer) header above the GOV are successively placed just after the RTP header.

If the VS header, the VO header, or the VOL header, which has a small code amount, is divided across RTP packets, code amount overhead caused by the RTP header grows and the code amount increases. Then, the header information pieces are entered in one RTP packet as shown in FIG. 11A, whereby the overhead caused by the RTP header is reduced and an increase in the code amount is suppressed.

Figure 11B:
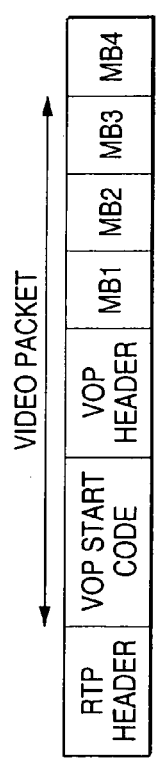
Figure 11C:
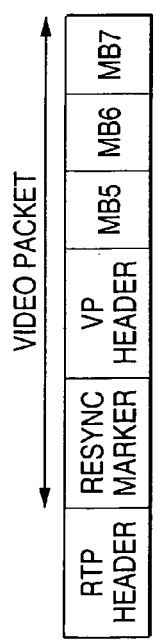

FIGS. 11B and 11C show examples of entering one video packet in one RTP packet. When the packet loss rate of the transmission line for sending a code string is high, if each video packet is entered in one RTP packet, even if a packet loss occurs, only one video packet is lost, so that error resistance is improved. As previously described with reference to FIG. 3D, if video coding is performed so that a part of the VOP header information is entered in the video packet header, the information can be used to code a moving image if the RTP packet containing the VOP header is lost.

Figure 11D:
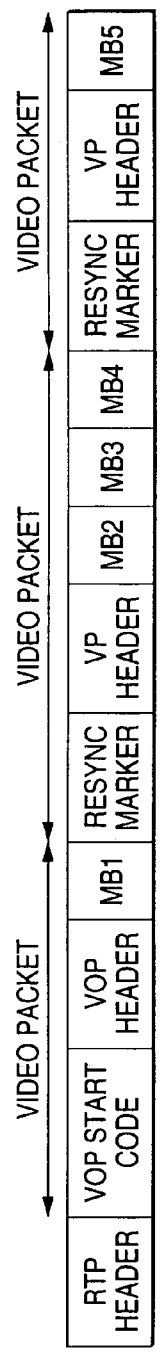

FIG. 11D shows an example of entering a plurality of video packets in one RTP packet. If too fine division into RTP packet is executed, overhead caused by the RTP header grows. Thus, if the bit rate of the transmission line is low, a plurality of video packets may be thus entered in one RTP packet.

Figure 11E:
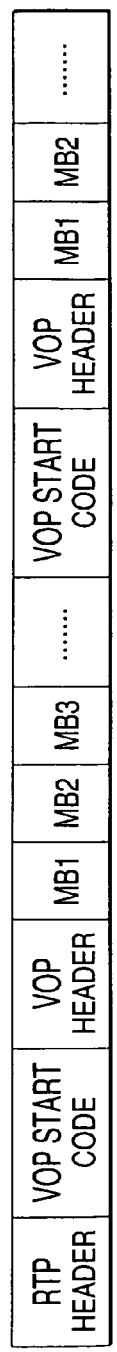

FIG. 11E shows an example of entering a plurality of VOPs in one RTP packet. In doing so, the overhead caused by the RTP header can be reduced more than that in FIG. 11D.

Padding bits may be added the end of each RTP packet in FIGS. 11A to 11E so that the RTP packet length becomes a multiple of 32 bits. As the information pieces of the RTP header, the following may be used:

For the time stamp shown in FIG. 10, the time stamp contained in the video code string may be used intact or may be used with only the bit format changed. If the time stamp in the video code string is variable-length code, it may be converted into fixed-length code. If only one VOP header is contained in the video code string in the RTP packet as in FIG. 11A or 11C, the time stamp contained in the VOP header or the time stamp whose format is changed is used. If more than one VOP header is contained as in FIG. 11E, the time stamp of the first VOP header may be used. If no VOP header is contained as in FIG. 11C, the time stamp of the VOP header to which the video packet belongs is used.

The M bit in FIG. 10 may be set, for example, as follows:

(3-1) M is set to 1 only for the RTP packet containing a GOV header and the RTP packet containing a VOP header of VOP (I-VOP) undergoing intraframe coding; M is set to 0 for other RTP packets.

(3-2) M is set to 1 only for the last RTP packet if one VOP head is divided across RTP packets.

(3-3) M is set to 1 only if more than one VOP head is contained in an RTP packet.

(3-4) M is set to 1 only if more than one video packet is contained in an RTP packet.

Figure 12:
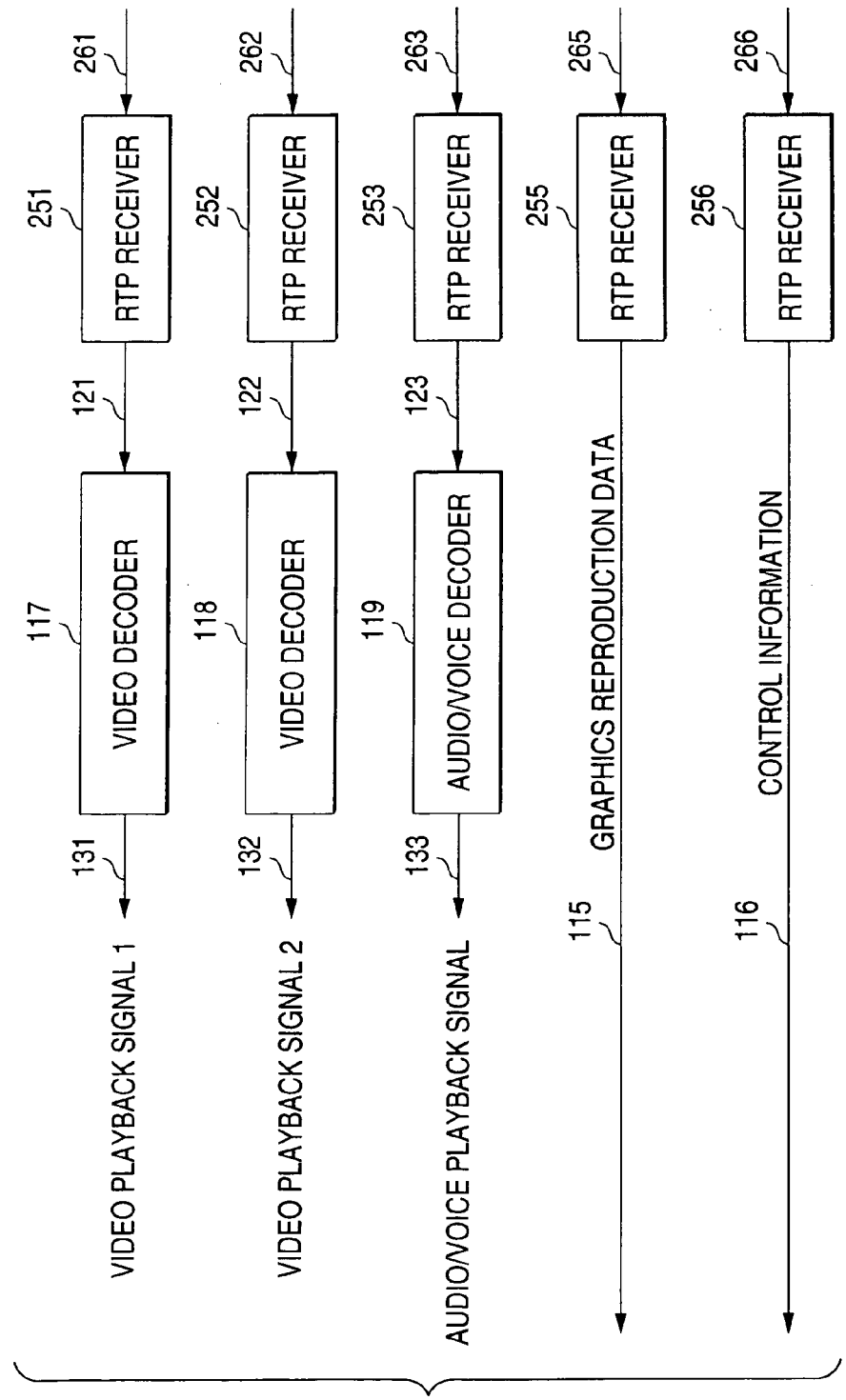
FIG. 12 is a block diagram of a decoding apparatus corresponding to the coding apparatus in FIG. 9.

FIG. 12 is a block diagram to show the configuration of a decoding apparatus corresponding to the coding apparatus in FIG. 9. Parts identical with those previously described with reference to FIG. 7 are denoted by the same reference numerals in FIG. 12 and only the differences from the decoding apparatus in FIG. 7 will be discussed. The decoding apparatus in FIG. 12 differs from that in FIG. 7 in that the RTP packets corresponding to video, audio/voice, graphics data, and control information are input to separate RTP receivers and are processed. The RTP packets are distributed to the corresponding RTP receivers based on port numbers, etc., on an IP layer (not shown).

If a packet loss of RTP packet or reversal of the packet arrival order occurs on the transmission line, the received RTP packet sequence numbers do not become serial or are reversed, thus the packet loss, etc., can be detected. The RTP receiver may restore the reversed RTP packet order to the correct order or feed back the detected packet loss rate, etc., to the coder as RTCP information (not shown).

If the RTP receiver 251, 252, or 253 detects an RTP packet loss, it may send a signal indicating occurrence of a packet loss (not shown) to the video decoder 117 or 118 or the audio/voice decoder 119.

The video decoder 117, 118 may perform the following decoding processing based on the sent signal indicating occurrence of the packet loss: For example, assume that video code string is divided for each video packet and RTP packet is generated, as shown in FIGS. 11B and 11C. Also, assume that the video packet header of the video packet in FIG. 11C contains some information of the VOP header as previously described with reference to FIG. 3C. If occurrence of packet loss in the RTP packet containing the VOP header in FIG. 11B is detected, to decode the video packet in the RTP packet in FIG. 11C, the video packet is decoded based on the information of the VOP header contained in the video packet header in place of the VOP header information. In doing so, if the RTP packet containing the VOP header is lost, the video code string contained in any other RTP packet can be decoded correctly.

According to the embodiment, VOP header information and packet header information added in the video coder 17 or 18 or the audio/voice coder 19 are added to image code string in the RTP sender.

Third Embodiment

Figure 13:
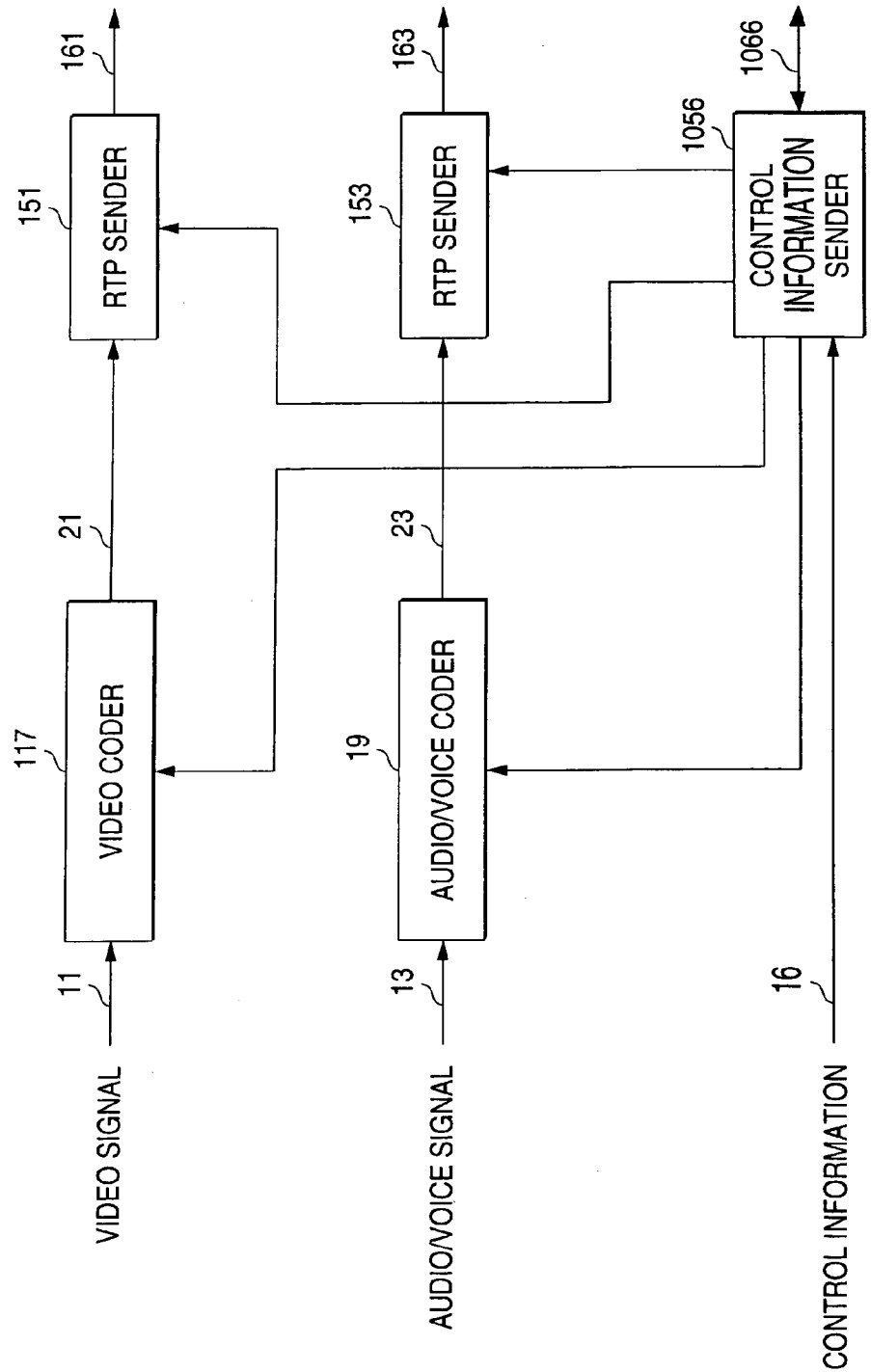
FIG. 13 is a block diagram of a coding apparatus according to a third embodiment of the invention.

FIG. 13 shows the configuration of a coding apparatus according to a third embodiment of the invention. Parts identical with those previously described with reference to FIGS. 1 and 9 are denoted by the same reference numerals in FIG. 13 and only the differences will be discussed in detail.

First, control information 16 is input to a control information sender 1056. The control information 16 contains information indicating the coding system and mode applied when a video coder 17 compresses and codes a video signal 11, information indicating the coding system and mode applied when an audio/voice coder 19 compresses an audio/voice signal 13, and information indicating the RTP coding system and mode applied in RTP senders 151 and 153.

The information indicating the coding system and mode may include the following:

Video coding method (MPEG-1, MPEG-2, MPEG-4, H.261, H.263, JPEG, etc.,), profile level (main profile main level, simple profile level 1, etc.,), coding option mode type;

information indicating the number of pixels of one frame of video signal (CIF/QCIF/SIF/VGA, etc.,) and the numbers of horizontal and vertical pixels;

time resolution of video signal (Hz, etc.,);

coding bit rate;

coding delay;

RTP coding method and configuration, for example, meaning of RTP time stamp, resolution, meaning of marker bit, etc.,;

information as to which of video signal and audio/voice signal is not coded.

The input control information 16 is coded in the control information sender 1056 and is input to a decoding apparatus (described later) via a transmission medium (not shown) as a control information code string 1066. At the time, the decoding apparatus may always perform decoding based on the information indicating the coding method and mode sent with the control information code string 1066. Alternatively, the following negotiation operation may be performed via a transmission medium (not shown) between the coding apparatus and the decoding apparatus:

(1) If the sent the information indicating the coding method and mode indicates a coding method or mode that cannot be applied in the decoding apparatus, information indicating the fact is sent to the control information sender 1056. Then, the control information sender 1056 again sends a control information code string 1066 indicating a coding method and mode changed in the range in which the coding apparatus can adopt. Such operation is repeated until the coding method and mode that can be applied in the decoding apparatus are found.

(2) Pairs indicating candidates of coding methods and modes that can adopted in the coding apparatus are built in the control information code string 1066 and the decoding apparatus selects a suitable coding method and mode and sends the information indicating the selected coding method and mode to the control information sender 1056.

The information indicating a coding method and mode contained in the control information 16 is also sent to the video coder 17, the audio/voice coder 19, and the RTP senders 151 and 153, and coding is performed based on the coding method and mode. If the negotiation operation is performed, the information indicating the coding method and mode determined by the negotiation operation is sent.

The video signal 11 and the audio/voice signal 13 are input to the video coder 17 and the audio/voice coder 19 respectively and video coding and audio/voice coding are performed based on the coding method and mode indicated on the information sent from the control information sender 1056, then a video code string 21 and an audio/voice code string 23 are output.

The operation of the video coder 17 and the audio/voice coder 19 is similar to that in the coding apparatus in the first and second embodiments. The structure of the video code string 21 is also similar to that in the first and second embodiments, as shown in FIG. 3.

The video code string 21 and the audio/voice code string 23 are input to the RTP senders 151 and 153, and RTP coding is performed based on the coding method and mode indicated on the information sent from the control information sender 1056.

The RTP sender 151 divides the video code string 21 into packets in accordance with one determined rule, adds RTP header information containing a time stamp, etc., and generates RTP packet, then outputs as an RTP code string 162. Although dividing the video code string 21 into packets and getting information of the time stamp, etc., for RTP header generation may be performed while the video code string 21 is being analyzed, packet length information and time stamp information (not shown) may be sent from the video coder 17 to the RTP sender 151 and dividing into packets and RTP header generation may be performed based on the information. This eliminates the need for the RTP sender 151 to analyze the video code string 21, so that processing is reduced.

Figure 14:
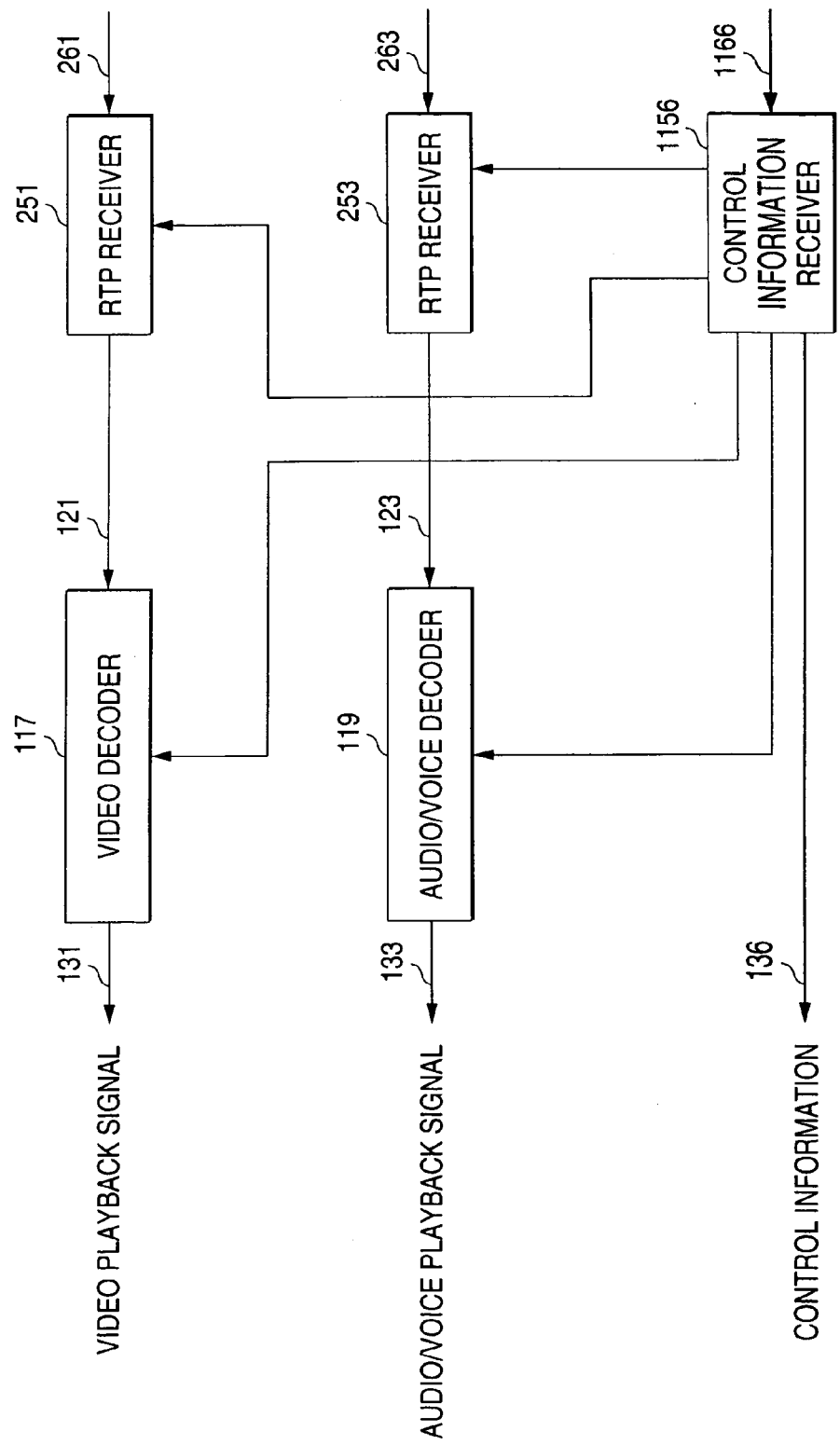
FIG. 14 is a block diagram of a decoding apparatus corresponding to the coding apparatus in FIG. 13.

FIG. 14 is a block diagram to show the configuration of the decoding apparatus corresponding to the coding apparatus in FIG. 13.

First, a control information code string 1166 received via a transmission line or a storage medium (not shown) is input to a control information receiver 1156 and control information 136 concerning the coding method and mode used in the coding apparatus is decoded and output. At the time, the negotiation operation may be performed between the decoding apparatus and the control information sender 1056 for determining the coding method and mode, as described in the operation description of the coding apparatus in FIG. 13. Of the decoded and determined control information, the information concerning the coding method and mode of the video signal and that concerning the coding method and mode of the audio/voice signal are input to a video decoder 117 and an audio/voice decoder 119 respectively. The information concerning the coding method and mode of the RTP code strings is input to RTP receivers 251 and 253.

The RTP code strings 251 and 253 received via a transmission line or a storage medium (not shown) are received at the RTP receivers 251 and 253, and RTP decoding is performed, then a video code string 121 and an audio/voice signal code string 123 are output. The operation of the RTP receiver 251 and that of the RTP receiver 253 correspond to the operation of the RTP sender 151 and that of the RTP sender 153 respectively.

The video code string 121 and the audio/voice signal code string 123 are input to the video decoder 117 and the audio/voice decoder 119 respectively, which then perform video decoding and audio/voice decoding and output a video reconstruction signal 131 and an audio/voice reconstruction signal 133. The decoding operation of the video decoder 117 and that of the audio/voice decoder 119 correspond to the coding operation of the video coder 17 and that of the audio/voice coder 19 in the coding apparatus previously described with reference to FIG. 13. They are similar to those of the decoders in the decoding apparatus of the first and second embodiments and therefore will not be discussed again in detail.

In the third embodiment, graphics data can also be transmitted and a plurality of video signals can also be coded and transmitted as in the first and second embodiments. In this case, separate RTP senders code and transmit the graphics data and a plurality of video signals.

In the embodiment, the RTP senders code the video code string and the audio/voice code string separately, but as in the first embodiment, first, system multiplexer 20 may multiplex the video code string and the audio/voice code string, then RTP sender may perform RTP coding. In this case, the control information sender may code only control signal 16 or new control information may be provided aside from the control information 16 and may be coded by the control information sender.

Sync layer packet (SL-PDU) generator 32 in the multiplexer 20 may only divide code strings output from access unit generators 31a to 31e into smaller packets as required without adding any header information. In this case, the SL-PDU header in the RTP format in FIG. 5 does not exist and only SL-PDU payload to which RTP padding is added as required exists in RTP payload.

In the above-described embodiment, the sequence number and the time stamp in the RTP header may begin with a random number. If they are set to determined initial values, such as 0, the possibility that a third party may find the first RTP packet in a video audio sequence by finding the initial value and may decode RTP code sting is high. If random numbers are set as the initial values, such a possibility is lowered and security is improved. If time stamp information is provided, for example, by converting from time stamp information in video code string, the time stamp in the video code string to which a random number is added may be adopted as the time stamp in the RTP header.

Fourth Embodiment

A fourth embodiment of the invention is the same as the second and third embodiments in the basic configurations of coding apparatus and decoding apparatus; they differ only in time stamp field added to an RTP-header and therefore only the differences will be discussed in detail.

FIGS. 15A to 15E are drawings to show examples of formats of time stamp multiplexed to RTP header (time stamp field in FIG. 10). In the MPEG-4 standard (refer to document 4), a time stamp in the format of combining an MTB (module_time_base) field provided by coding the time difference in second units in variable length and VTI (VOP-_time_increment) indicating the time with a finer precision than seconds is used as time stamp in video code string.

Figure 15A:
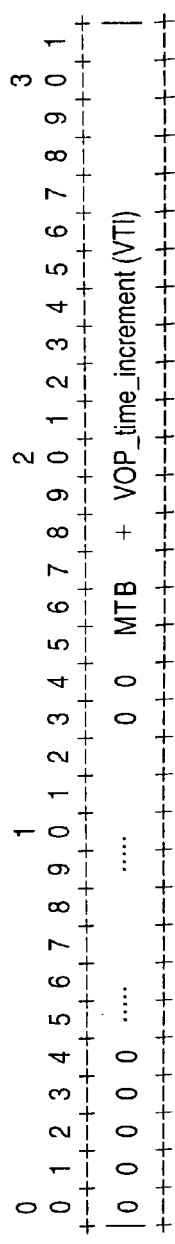
FIGS. 15A to 15E are drawings to show time stamp formats to describe a fourth embodiment of the invention.

FIG. 15A shows an example of using a variable-length-coded time stamp of MPEG4 video intact in time stamp field in RTP header. In this case, the time stamp information of the video code string in MPEG4 is put in the intact format, thus processing is simplified in such a system configuration comprising an MPEG4 video coding section and an RTP packet conversion section separately.

Figure 15B:
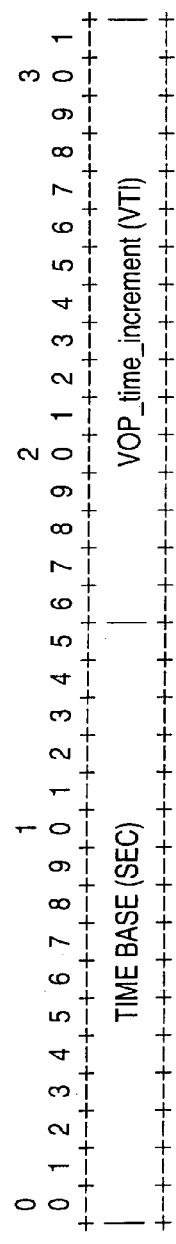

FIG. 15B shows a time stamp example wherein the absolute time from one time is used as a time base in second units without using the MTB provided by coding the time difference in second units in variable length as it is, and the VTI indicating a finer precision than seconds is represented in a fixed length of a proper number of bits. In this example, second units are also multiplexed directly to the RTP header in the absolute time. To use the time stamp information in the RTP header, processing is facilitated, stronger resistance to a packet loss can be provided, and further to use a header compressing technique of IP, UDP, and RTP heads together, higher efficiency can be provided.

That is, in the example in FIG. 15A, the time difference in second units is coded in variable length and thus to use the time stamp information in an RTP layer, processing of once decoding the variable-length code becomes necessary, but the time stamp in the example in FIG. 15B can be used directly without requiring the processing.

In the example in FIG. 15A, the MTB has a value other than zero only when the time stamp changes in second units. If a packet loss occurs in the packet by chance, the receiving party cannot sense time stamp change in second units and after this, a time stamp discrepancy in second units occur between the transmitting party and the receiving party all the while. In contrast, in the example in FIG. 15B, the elapsed time since one time is also represented by an absolute value in second units, so that such a discrepancy does not occur.

To use RTP on an intranet or the Internet, a technique called header compression may be used to avoid overhead of IP/UDP/RTP headers. The header compression is described in detail, for example, in document 5, "Compressing IP/UDP/RTP headers for Low-Speed Links," RFC 2508, Internet Engineering Task Force (February 1999). In the header compression technique, information in the header field having the same value as the header information in the immediately preceding packet or information in the header field having a constant difference value from the header information in the immediately preceding packet usually is not transmitted and only when exceptional behavior occurs, the information in the field is sent.

In the RTP header, the time stamp field is also a filed to which header compression is applied. It is expected that in consecutive RTP packets, the values increase constantly and the difference value therebetween becomes constant. However, if representation of an MPEG4 video code string as in FIG. 15A is directly put as the time stamp in the RTP header for putting MPEG4 video on an RTP packet, the differences do not become constant in simple time stamp field difference processing between the preceding packet and the current packet, and the requirement of the header compression technique cannot be satisfied. As a result, the possibility that efficiency will not become very good is high even if header compression is executed.

Then, if the format as shown in FIG. 15B is used as a time stamp, such a problem does not arise and high compression efficiency can also be provided if IP/UDP/RTP header compression is executed.

Figure 15C:
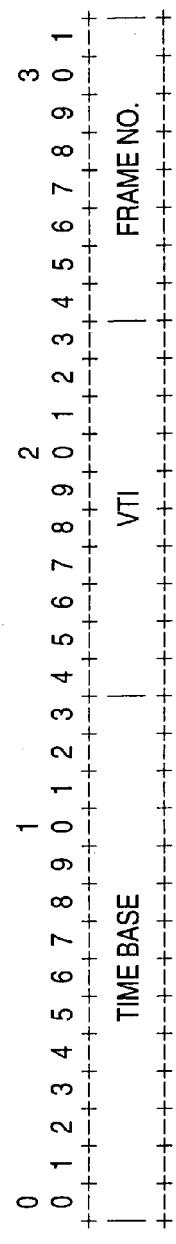

In the format in FIG. 15C, serial number information (frame No.) of image frame is added to the format in FIG. 15B, whereby how many image frames are discarded when packet discard occurs can be easily known in addition to the above-described features of the format in FIG. 15C.

Figure 15D:
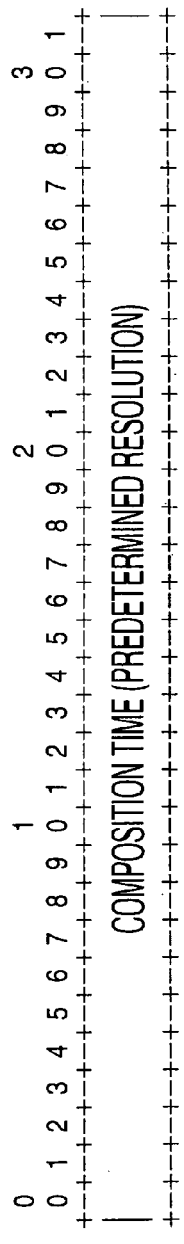
Figure 15E:
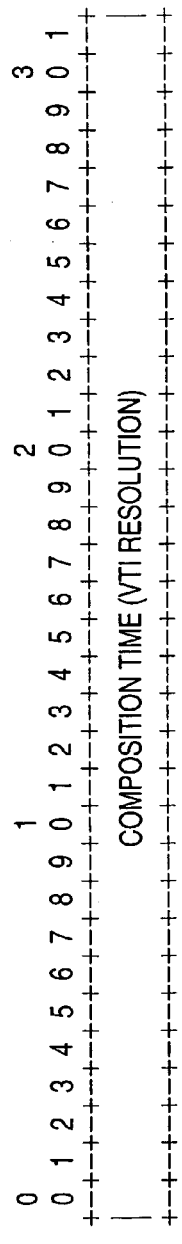
Figure 16:
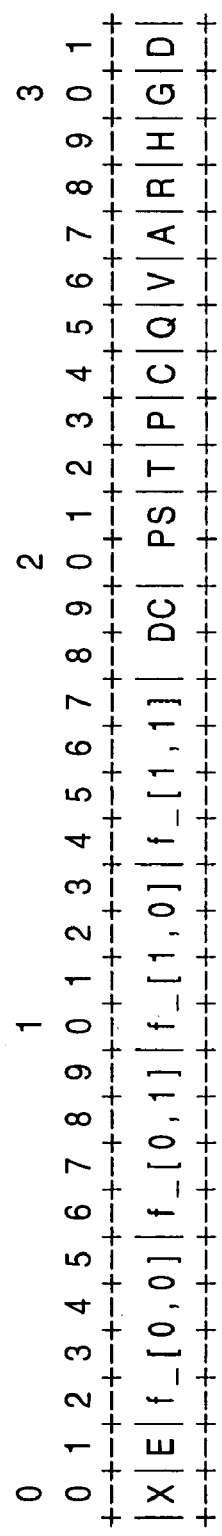
FIG. 16 is a drawing to show an RTP format in a related art.

FIGS. 15D and 15E show examples of using composition time calculated from VTI and MTB. The composition time is provided by adding VTI representing the time with a finer precision than seconds to accumulation of the differences in second units represented by MTB. In the examples, the time stamp field in the RTP header can be represented flat without providing a more finely divided structure, so that RTP header processing is facilitated. In this case, the features that if header compression is executed, high compression efficiency can be provided and that if a packet loss occurs, the time stamp discrepancy between the transmitting and receiving parties does not occur as in the formats in FIGS. 15B and 15C are not impaired.

The formats in FIGS. 15D and 15E differ in representation precision of the composition time. In the format in FIG. 15D, the composition time is represented with a predetermined precision and in the format in FIG. 15E, the composition time is represented with the same precision as the representation precision of VTI in the video code string. In the format in FIG. 15D, for example, the representation precision may be made the same as the system clock precision of the coding apparatus and the decoding apparatus or may be made the same as the precision of the clock used on the network. In the example in FIG. 15E, the information indicating the representation precision may be contained in the control information and is sent from the coding apparatus to the decoding apparatus or the representation precision is determined based on the information representing the VTI representation precision in the video code string.

In FIGS. 15A to 15E, the bit width of each field is limited for describing the time stamp formats, but each bit width may be previously determined in response to the application and is not limited to the bit widths shown in the figures. The origin of the time represented by the time stamp need not necessarily begin with zero and may be selected at random for improving safety if the communication line is encrypted.

Fifth Embodiment

A fifth embodiment of the invention is the same as the second and third embodiments in the basic configurations of coding apparatus and decoding apparatus; they differ only in M bit field added to an RTP header and therefore only the differences will be discussed in detail.

The M bit (M in FIG. 10) is a one-bit flag contained in an RTP header indicating that such information for causing a particularly important event to occur is contained in one packet as compared with any other packet; it is previously determined in response to the type of multimedia information put on RTP payload. The M bit may be set, for example, as follows:

(1) M is set to 1 only for the RTP packet containing a GOV header and the RTP packet containing a VOP header of VOP (I-VOP) undergoing intraframe coding; M is set to 0 for other RTP packets.
(2) M is set to 1 only for the last RTP packet if one VOP head is divided across RTP packets.
(3) M is set to 1 only if more than one VOP head is contained in an RTP packet.
(4) M is set to 1 only if more than one video packet is contained in an RTP packet.
(5) M is set to 1 only if RTP payload begins at the top of each layer shown in FIG. 2.

To define the M bit as in (1), the advantage is provided that the fact that the packet with the M bit set to 1 is a packet containing video information that can become a random access point can be easily known. That is, in other methods, unless the header information of MPEG4 video code bit string contained in RTP payload is decoded, whether or not it is a random access point cannot be determined; however, in the method, processing of the RTP header process portion in a communication unit on a transmission line or in the receiving party is only performed, whereby whether or not the current packet being processed contains information that can become a random access point is known, and processing is very facilitated in searching for a random access point.

To define the M bit as in (2), whether or not transmission of one VOP is complete can be determined based the M bit in such a case where VOP is divided across RTP packets and transmitted if the packet length of RTP payload is short as compared with the number of code bits of VOP, usually observed when the code bit rate is high. This has a good affinity for definition of the RTP format for MPEG1/MPEG2 video shown in document 4, and commonality of processing can be easily accomplished.

In contrast, the definition of the M bit in (3) or (4) indicating that more than one VOP or video packet is contained in one RTP packet has effectiveness in such a case where the packet length of RTP payload is equal to or comparatively longer than the code bit length of VOP in such application where the code bit rate is comparatively low.

To define the M bit as in (5), whether or not the header information of each layer in MPEG4 video code string is contained in the RTP packet is indicated, and the definition of the M bit becomes effective for protecting the important information contained in the header information. As the header types, more particularly, configuration information functions (VisualObjectSequence( ), VisualObject( ), VisualObjectLayer( ), or entry point functions for elementary streams (Group_of_VideoObjectPlane( ), VideoObjectPlane( ), video_plane_with_short_header( ), MeshObject( ), FaceObject( )) are included.

Sixth Embodiment

A sixth embodiment of the invention is the same as the first embodiment in the basic configurations of coding apparatus and decoding apparatus; they differ only in dividing rules of video code string in access unit generators 31a to 31e and sync layer packet generator and therefore only the differences will be discussed in detail.

When a sync layer packet is divided and put on RTP payload, satisfying all the following four items may be adopted as a rule:

(3-1) Each header above the VOL in the hierarchical structure in FIG. 2 must be placed at the top of the sync layer packet payload (just after the sync layer packet header) or just after the higher-layer header;

(3-2) a higher-layer header than the header placed at the top of the sync layer packet payload must not exist at an intermediate point of the payload;

(3-3) if one or more headers exist in the sync layer packet payload, the payload must always begin with the header; and (3-4) header must not be divided across sync layer packets.

These differ from the dividing rules (1-1) to (1-4) shown in the first embodiment only in handling the GOV header.

Seventh Embodiment

A seventh embodiment of the invention is the same as the second and third embodiments in the basic configurations of coding apparatus and decoding apparatus; they differ only in dividing rules of video code string put on RTP payload and therefore only the differences will be discussed in detail.

When a video code string is divided and put on RTP payload, satisfying all the following four items may be adopted as a rule:

(4-1) Each header above the VOL in the hierarchical structure in FIG. 2 must be placed at the top of the RTP payload (just after the RTP header) or just after the higher-layer header;

(4-2) a higher-layer header than the header placed at the top of the RTP payload must not exist at an intermediate point of the payload;

(4-3) if one or more headers exist in the RTP payload, the payload must always begin with the header; and (4-4) video header must not be divided across RTP packets.

These differ from the dividing rules (2-1) to (2-4) shown in the second embodiment only in handling the GOV header.

FIGS. 17A and 17C are drawings to describe RTP packet division prohibited in the rules (4-1) to (4-4); FIGS. 17A and 17C show examples of RTP packets not prepared if RTP packet division is executed according to the rules, whereas FIG. 17B shows an example prepared based on the rule.

In FIG. 17A, a VOP header is divided across RTP packets, but dividing the video header across RTP packets is prohibited based on the rule (4-4). A VOP start code is prefixed to the top of the VOP header and the decoder can determine the top position of the VOP header based on the start code. However, if the VOP header is divided as shown in FIG. 17A, no VOP start code exists in the second RTP packet. Thus, if the first RTP packet in the figure is lost, the top position of the VOP header is not found, making it impossible for the decoder to decode the VOP header correctly. Thus, dividing the video header across RTP packets is prohibited according to the division rule. FIG. 17A shows the VOP header example, but the description also applies to any other video header, such as a VS header, a VO header, a VOL header, or a video packet header.

FIGS. 17B and 17C show examples wherein two video packets are divided in two RTP packets. FIG. 17C shows an example of violating the division rule (4-3) because video packet header (VP header) is placed at a position other than the top of RTP payload in the second RTP packet.

In FIG. 17B, one video packet is entered in one RTP packet; in FIG. 17C, the first video packet is divided across two RTP packets and the latter half of the first video packet is entered in the same RTP packet as the second video packet. If RTP packet division is executed corresponding to video packet as shown in FIG. 17B, even if one RTP packet is lost due to an error, the video packet entered in the other RTP packet can be decoded. In contrast, in FIG. 17C, if the second RTP packet is lost, information not only in the second video packet, but also in the first video packet is lost, thus both video packets cannot be decoded correctly. Therefore, dividing as in FIG. 17C is prohibited according to the division rule.

The RTP packet division examples prohibited according to the division rules (4-1) to (4-4) have been described; if the division rules (2-1) to (2-4) are used, RTP packet preparation as in FIGS. 17A and 17C are also prohibited.

Next, a specific example of information storage media according to the invention will be discussed.

Figure 18:
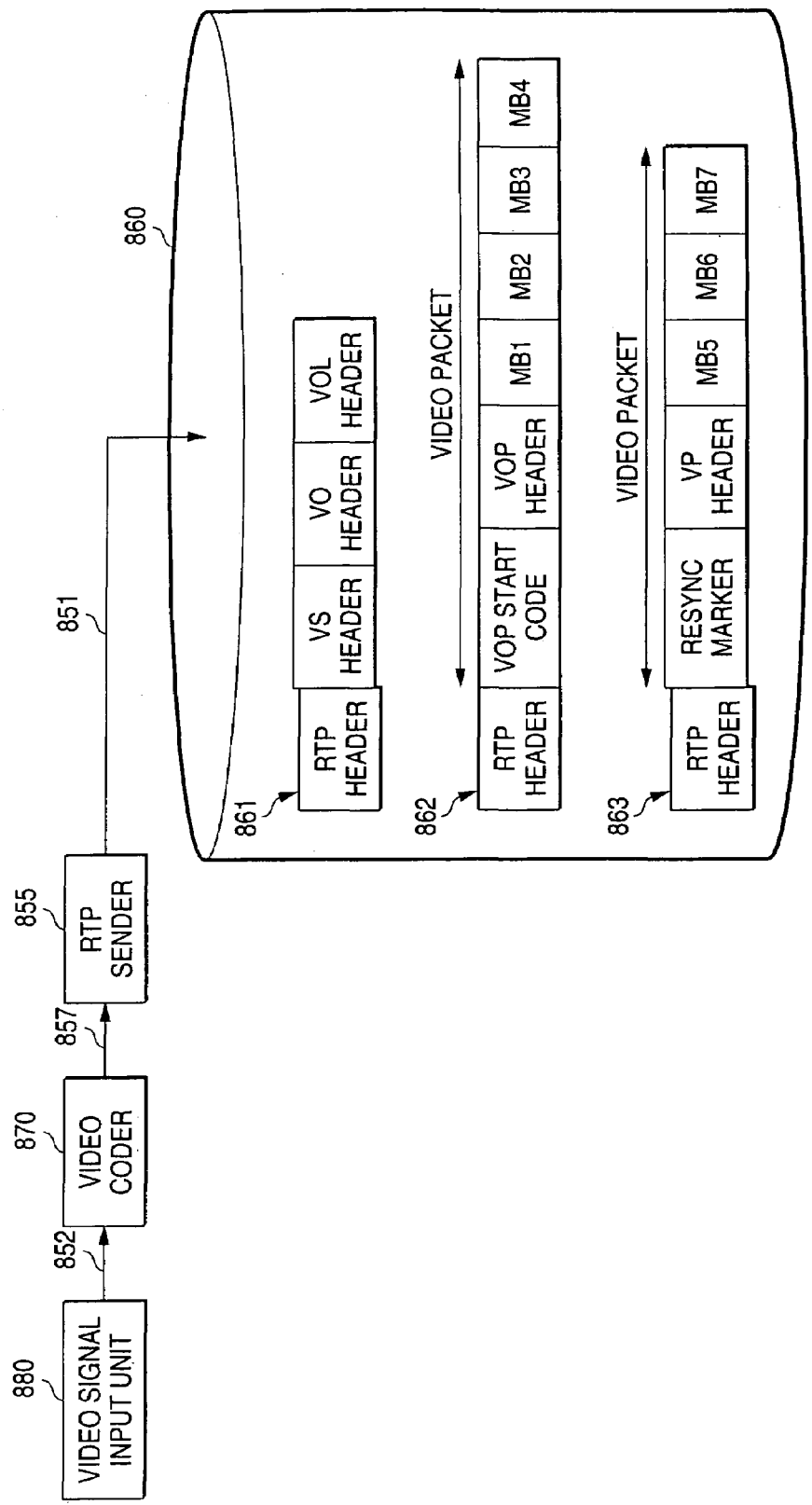
FIG. 18 is a block diagram to show a coding apparatus for generating information and a medium for recording the information according to the invention.

FIG. 18 is a block diagram to show a system for using a coding apparatus to prepare RTP and record it on a record medium according to the invention. Numeral 880 denotes a video signal input unit for inputting a video signal. The video signal input unit is, for example, a video camera. Alternatively, a video signal recorded on a record medium (not shown) may be input or a video signal may be input from another apparatus or system via a transmission line (not shown). A video coder 870 performs moving image coding on an input video signal 852 and outputs a video code string 857. The video code string 857 is input to an RTP transmitter 855, which then outputs an RTP packet 851. The RTP packet 851 is recorded on a storage medium 860.

Information indicating the length of RTP packet (not shown) may also be recorded on a record medium 810.

Figure 19:
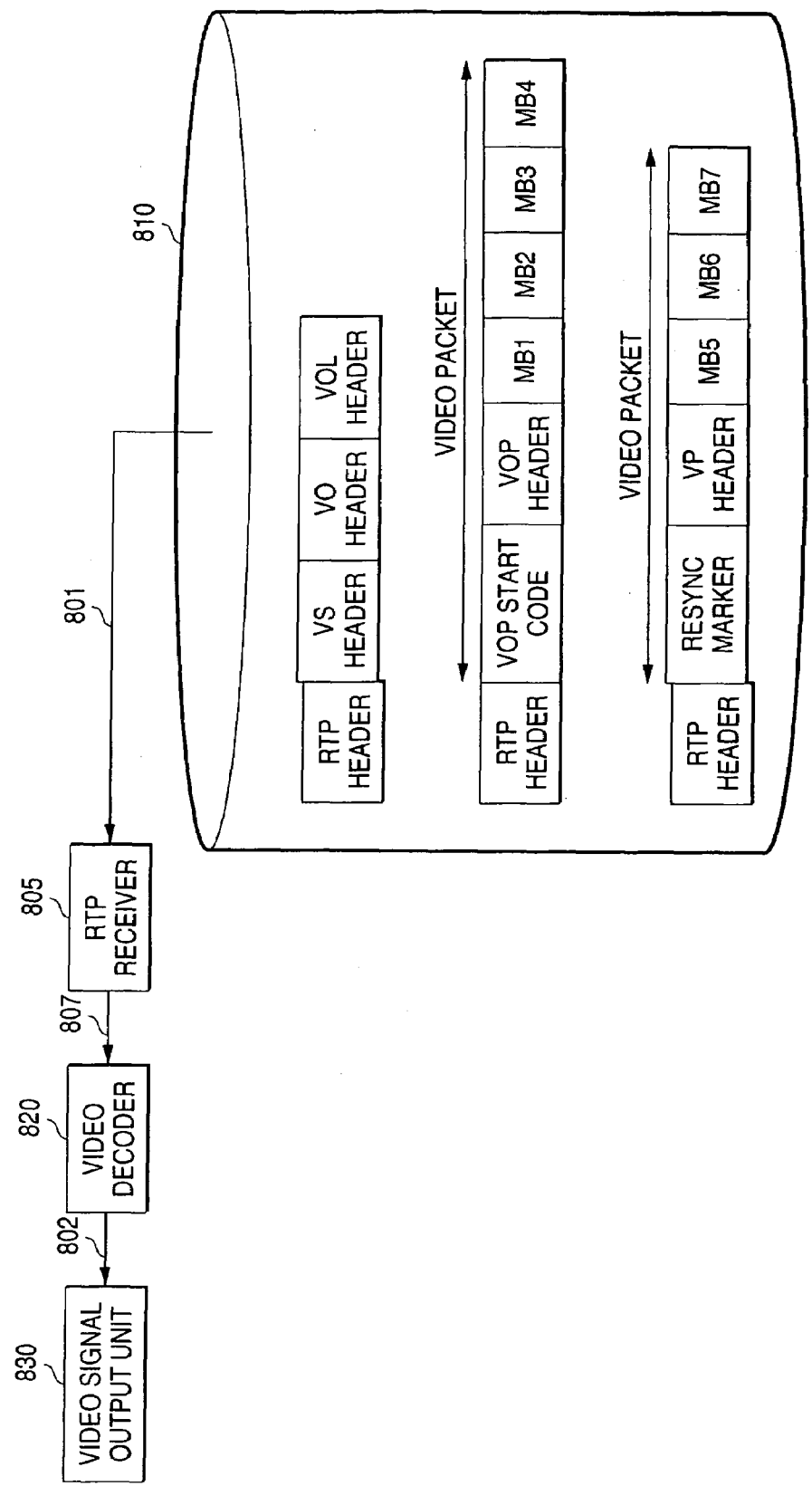
FIG. 19 is a block diagram to show an information record medium and a decoding apparatus for decoding the information according to the invention.

FIG. 19 is a block diagram to show a system for reproducing a video signal using the record medium 810 prepared using the system in FIG. 18. A code string containing an RTP packet coded by the coding apparatus according to the invention is stored on the record medium 810. Numeral 805 denotes an RTP receiver for decoding an RTP packet 801 recorded on the record medium 810. The RTP receiver 805 decodes the time stamp and the sequence number of an RTP packet header and outputs a video code string 807. If information indicating the length of RTP packet (not shown) is also recorded on the record medium 810, the information is also input to the RTP receiver 805 for executing RTP decoding. Numeral 820 denotes a video decoder for reproducing a video playback signal 802 from the video code string 807. Numeral 830 denotes a video signal output unit for outputting a video signal. The video signal output unit is, for example, a display. Alternatively, a reproduced video signal may be recorded on a storage medium (not show) or may be transmitted to another apparatus or system via a transmission line (not shown).

The described system stores RTP packets in the format previously covered in the description of the embodiments on the storage medium 810. The RTP packets are characterized by the fact that RTP packet division is executed based on the RTP packet division rules (1-1) to (1-4), (2-1) to (2-4), and (4-1) to (4-4) and that the time stamp of each RTP header is prepared by converting the bit format of the time stamp of the video code string as described above.

In the example in FIG. 18, in the whole system, only one video playback signal is input and one video coder and one RTP transmitter prepare an RTP packet. However, as in the above-described embodiments, more than one RTP transmitter and more than one video coder may be used to code more than one video signal. In this case, a plurality of RTP packet strings corresponding to a plurality of video input signals may be stored on the storage medium 860 or separate storage media may be used in one-to-one correspondence with the video playback signals.

In the example in FIG. 19, the whole system contains one RTP receiver and one video decoder and reproduces only one video playback signal. However, as in the above-described embodiments, more than one RTP receiver and more than one video decoder may be used to reproduce more than one video playback signal. In this case, a plurality of RTP packet strings corresponding to a plurality of video playback signals may be recorded on the record medium 810 or separate storage media may be used in one-to-one correspondence with the video playback signals. A plurality of video playback signals may be output to separate video signal output units or a plurality of video signals may be combined by a video signal combiner (not shown) and output to one video signal output unit.

Figure 20:
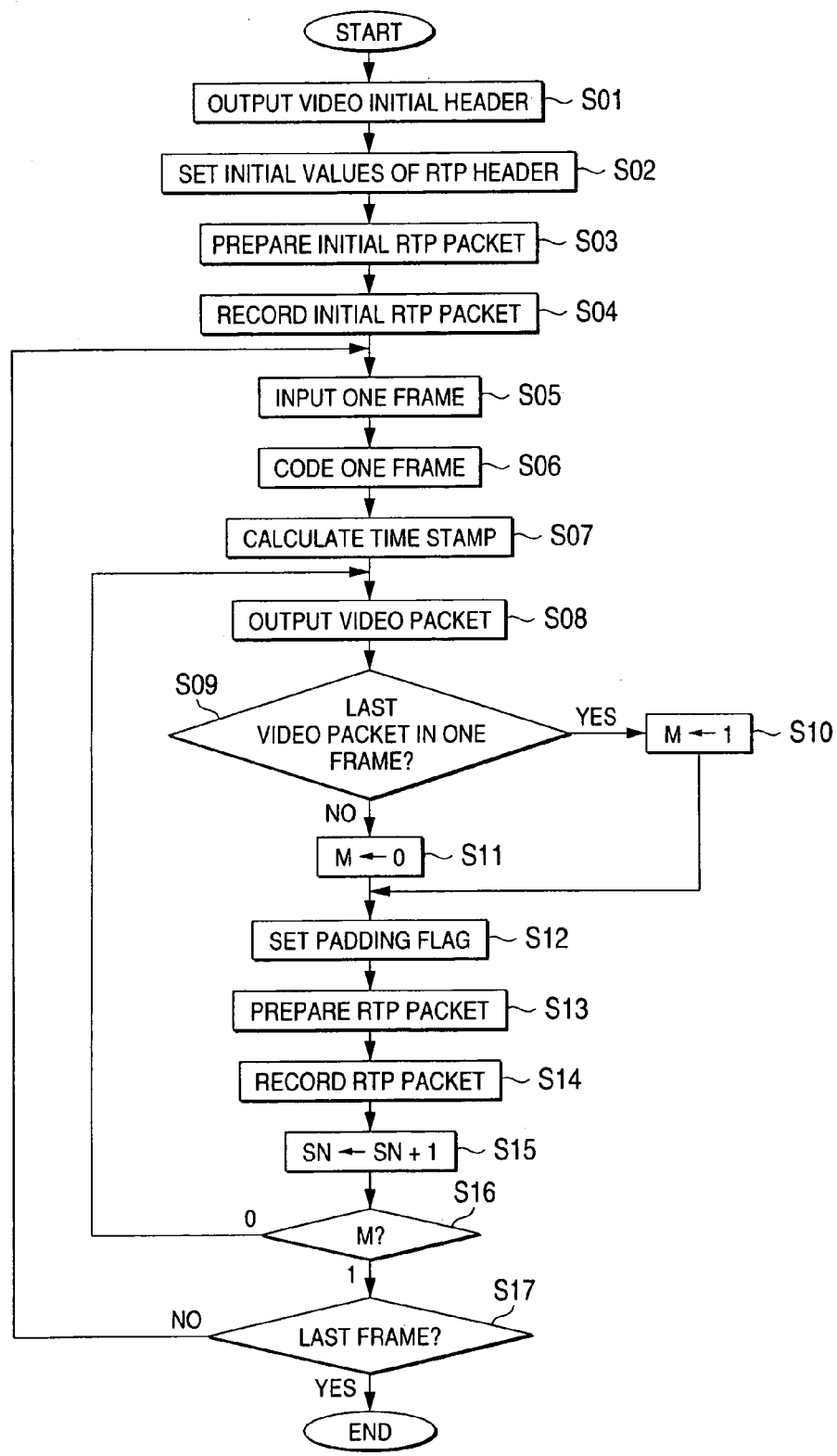
FIG. 20 is a flowchart to show information recording and preparation processing according to the invention.
Figure 21:
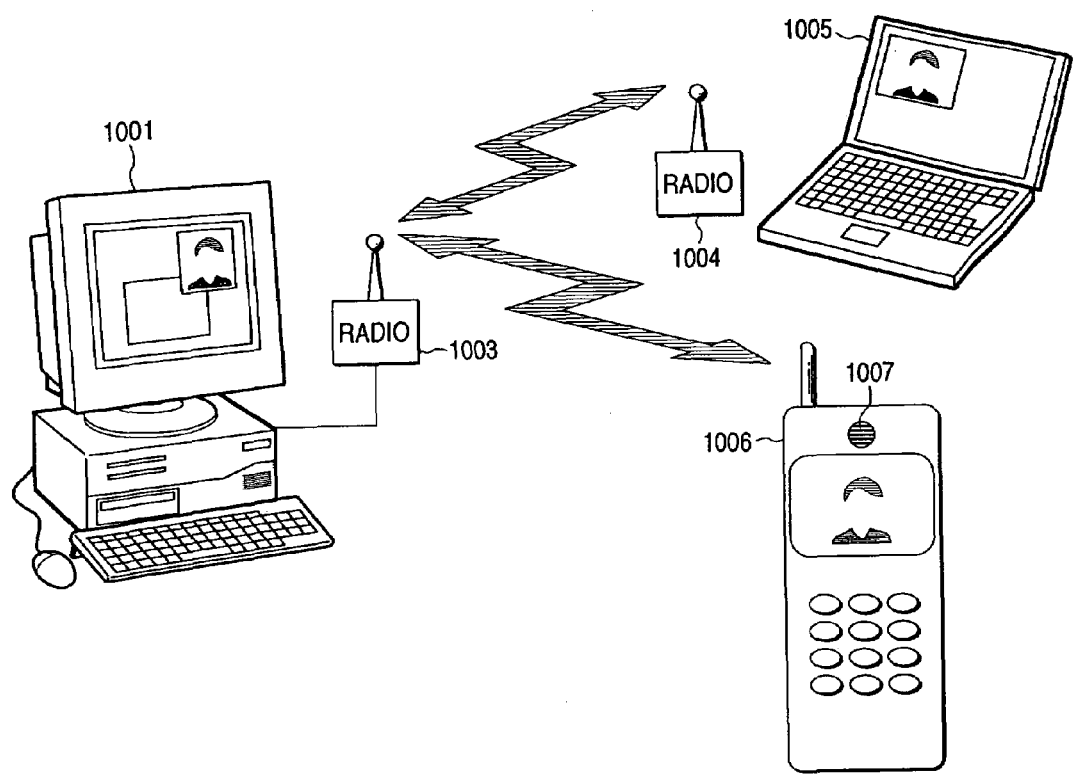
FIG. 21 is a block diagram to show an example of a wireless moving image transmission system incorporating the coding apparatus and the decoding apparatus according to the invention.

FIG. 20 is a flowchart to show processing of executing moving image coding and RTP packet preparation and recording the RTP packets on the storage medium in the coding system in FIG. 18.

First, the video coder 870 prepares a video initial header and outputs it to the RTP transmitter 855 at step Sol. The video initial header corresponds to the VS, VO, VOL header in the video syntax structure previously described with reference to FIG. 2, for example, and indicates the coding mode of one whole video stream. Next, an RTP header is initialized at step S02. In the RTP header, the payload type (PT) and SSRC, each an information piece taking a given value for one video input signal, are set. The initial values of the sequence number (SN) and the time stamp are also set. The initial values of the sequence number (SN) and the time stamp may be set to fixed values (for example, 0) or may be random numbers. Next, with the video initial header prepared at step S01 as RTP payload, the initial RTP header prepared at step S02 is added and an initial RTP packet is prepared at step S03. Further, the prepared initial RTP packet is recorded on the storage medium 860 at step S04.

At steps S05 to S17, a video signal is input one frame (VOP, also called a picture) at a time, moving image coding is performed, and an RTP packet is prepared and recorded. First, one frame of a video signal is input from the video signal input unit 880 at step S05. The video coder 870 converts one frame of the video signal input into a moving image code string at step S06. The time stamp of the RTP header is calculated at step S07. The time stamp may be calculated based on time stamp information modulo_time_base (MTB) and VOP_time_increment (VTI) of video code string as previously described in the embodiment.

The moving image code string provided at step S06 is output one video packet at a time and is input to the RTP transmitter 855 at step S08. At steps S08 to S16, the RTP transmitter 855 prepares and records an RTP packet while inputting one video packet at a time.

At steps S09 to S11, the marker bit (M) of the RTP header is calculated. Whether or not the input video packet is the last video packet in one frame is determined at step S09. If the video packet is the last video packet, M is set to 1 at step S10; otherwise, M is set to 0 at step S11.

Next, padding processing of the RTP payload is performed and the padding flag bit (P) of the RTP header is set at step S12. The length of the input video packet is calculated and if the length is a multiple of 32 bits, the padding flag (P) of the RTP header is set to 0 and the video packet is used as RTP payload intact. If the length is not a multiple of 32 bits, the padding flag is set to 1 and padding bits are added to the tail of the video packet so that the length of RTP load becomes a multiple of 32 bits.

In the RTP header, as information other than the marker bit or the padding flag set at steps S09 to S12, the values set at other steps are used. The thus setup RTP header and RTP payload are combined to prepare an RTP packet at step S13. The prepared RTP packet is recorded on the storage medium 860 at step S14. Whenever one RTP packet is generated and recorded, the sequence number (SN) is incremented by one at step S15. Next, whether the marker bit of the RTP header is 0 or 1 is determined at step S16 and branch processing is performed as follows: If M=0, the processed video packet is not the last video packet in the frame. Then, control returns to step S08 for repeating processing of inputting one video packet at a time and preparing and recording an RTP packet. If M=1, the processed video packet is the last video packet in the frame. Then, control goes to step S17. At step S17, whether or not the processed frame is the last frame of the video signal is determined. If the processed frame is the last frame, termination processing is performed. If the processed frame is not the last frame, control returns to step S05 for repeating processing of inputting the video signal one frame at a time, performing moving image coding, and preparing and recording an RTP packet.

In FIG. 18, numerals 861 to 863 indicate examples of RTP packets prepared and recorded according to the flowchart of FIG. 20. Numeral 861 indicates an example of an initial RTP packet prepared and recorded at steps S01 to S04. Numerals 862 and 863 indicate examples of RTP packets prepared and recorded at steps S05 to S17.

Next, as an application example of the invention, an embodiment of a moving image transmission system incorporating the coding apparatus and the decoding apparatus of the invention will be discussed with reference to FIG. 12.

A moving image signal input from a camera (not shown) installed in a personal computer 1001 undergoes moving image coding and RTP coding performed by the coding apparatus (or coding software) built in the personal computer 1001. An RTP packet output from the coding apparatus is transmitted by wireless by a radio 1003 together with any other voice and data information, and is received by another radio 1004. For example, portable telephones, PHSs, wireless LAN units, etc., may be used as the radios. The signal received at the radio 1004 is disassembled into the RTP packet of the moving image signal and the voice and data information. The RTP packet of the moving image signal is decoded by the decoding apparatus (or decoding software) built in a notebook computer 1005 and is displayed on a display of the notebook computer 1005. On the other hand, a moving image signal input from a camera (not shown) installed in the notebook computer 1005 is coded in a similar manner to that described above using the coding apparatus (or coding software) built in the notebook computer 1005. A prepared RTP packet and any other voice and data information are multiplexed and transmitted by wireless by the radio 1004 and received by the radio 1003. The signal received by the radio 1003 is disassembled into the RTP packet of the moving image signal and the voice and data information. The RTP packet of the moving image signal is decoded by the decoding apparatus (or decoding software) built in the personal computer 1001 and is displayed on a display of the personal computer 1001.

The coding apparatus and the decoding apparatus according to the invention can also be applied to moving image communication between the personal computer 1001 or the notebook computer 1005 and a portable videophone 1006. An RTP packet prepared by the coding apparatus built in the personal computer 1001 or the notebook computer 1005 and transmitted by wireless by the radio 1003 or 1004 is received at a radio built in the portable videophone 1006. The signal received at the radio is disassembled into the RTP packet of the moving image signal and the voice and data information. The RTP packet of the moving image signal is decoded by the decoding apparatus (or decoding software) built in the portable videophone 1006 and is displayed on a display of the portable videophone 1006. On the other hand, a moving image signal input from a camera 1007 built in the portable videophone 1006 is coded in a similar manner to that in the examples of the personal computer 1001 and the notebook computer 1005 described above using the coding apparatus (or coding software) built in the portable videophone 1006. A prepared RTP packet and any other voice and data information are multiplexed and transmitted by wireless by the radio built in the portable videophone 1006 and received by the radio 1003 or 1004. The signal received by the radio 1003 or 1004 is disassembled into the RTP packet of the moving image signal and the voice and data information. The RTP packet of the moving image signal is decoded by the decoding apparatus (or decoding software) built in the personal computer 1001 or the notebook computer 1005 and is displayed on the display of the personal computer 1001 or the notebook computer 1005.

As described throughout the specification, according to the invention, to divide a video code string provided by compressing and coding a video signal and enter in an RTP packet for transmission, the above-described dividing rules are used to enter header information in the video code string in the top of a sync layer packet or RTP payload, whereby the duplication function of important information provided by video coding is used effectively and resistance to a packet loss of RTP packet can be enhanced.

What is claimed is:

1. A moving image coding apparatus, comprising:
   coding means for (1) dividing an input moving image signal into a plurality of frame image signals, (2) dividing each of the frame image signals into a plurality of area image signals, (3) compression coding each area image signal into an area image code string, and (4) adding frame header information indicating a compression coding mode of the frame to each area image code string; and
   packetization means for collecting a plurality of area image code strings to which the frame header information has been added, and for adding packet header information to the collected plurality of area image code strings.

2. The moving image coding apparatus as claimed in claim 1, wherein said packetization means includes a multiplexer comprising:
   a plurality of access unit generators configured to separate the area image code strings into predetermined units and to generate access units from the plurality of access unit generators and to generate a sync layer packet.

3. The moving image coding apparatus as claimed in claim 1 wherein-said packet header information includes time stamp information generated by converting time stamp information in the code strings into a predetermined format.

4. The moving image coding apparatus as claimed in claim 1, wherein said frame header information includes any information of a time code, a VPO coding mode, intra DC VLC table change information, motion vector range information contained in the VOP header.

5. A moving image coding apparatus, comprising:
   a plurality of coding means for (1) dividing an input moving image signal into a plurality of frame image signals, (2) dividing each of the frame image signals into a plurality of area image signals, (3) compression coding each area image signal into an area image code-string, and (4) adding frame header information indicating a compression coding mode of the frame to the area image code string; and
   a plurality of packetization means for collecting a plurality of area image code strings to which the frame header information has been added, and for adding packet header information to the collected plurality of area image code strings.

6. The moving image coding apparatus as claimed in claim 5, wherein said packetization means includes a multiplexer comprising:
   a plurality of access unit generators configured to separate the area image code strings into predetermined units and to generate access units from the access unit generators and to generate a sync layer packet.

7. The moving image coding apparatus as claimed in claim 5, wherein said frame header information includes any information of a time code, a VPO coding mode, intra DC VLC table change information, motion vector range information contained in the VOP header.

8. A record medium recording a code string prepared by a moving image coding apparatus comprising:
   coding means for (1) dividing an input moving image signal into a plurality of frame image signals, (2) dividing each of the frame image signals into a plurality of area image signals, (3 compression coding each area image signal into an area image code string, and (4) adding frame header information indicating a compression coding mode of the frame to each area image code string; and packetization means for collecting a plurality of area image code strings to which the frame header information has been added, and for adding packet header information to the collected plurality of area image code strings.

9. A method of coding a moving image, comprising:
dividing an input moving image signal into a plurality of frame image signals;
dividing each of the frame image signals into a plurality of area image signals;
compression coding each area image signal into an area image code string;
adding frame header information indicating a compression coding mode of the frame to each area image code string; and
collecting a plurality of area image code strings to which the frame header information has been added, and adding packet header information to the collected plurality of area image code strings.

10. The method of coding a moving image as claimed in claim 9, further comprising:
separating the code strings into predetermined units and generating access units; and
receiving the access units and generating a sync layer packet.

11. A recording medium for executing a computer program comprising the steps of:
dividing an input moving image signal into a plurality of frame image signals;
dividing each of the frame image signals into a plurality of area image signals;
compression coding each area image signal into an area image code string;
adding frame header information indicating a compression coding mode of the frame to each area image code string; and
collecting a plurality of area image code strings to which the frame header information has been added, and adding packet header information to the collected plurality of code strings.

12. The recording medium for executing computer program as claimed in claim 11, wherein said computer program further comprises the steps of:
separating the code strings into predetermined units and generating access units; and
receiving the access units and generating a sync layer packet.

13. A moving image coding apparatus, comprising:
a coder configured to perform a function for (1) dividing an input moving image signal into a plurality of frame image signals, (2) dividing each of the frame image signals into a plurality of area image signals, (3) compression coding each area image signal into an area image code string, and (4) adding frame header information indicating a compression coding mode of the frame to the area image code string; and
a packetizator configured to perform a function for collecting a plurality of area image code strings to which the frame header information has been added, and for adding packet header information to the collected plurality of area image code strings.

14. The moving image coding apparatus as claimed in claim 13, wherein said packetizatior includes a multiplexer comprising:
a plurality of access unit generators configured to perform a function for separating the code strings into predetermined units and generating access units from the plurality of access unit generators and generating a sync layer packet.

15. The moving image coding apparatus as claimed in claim 13 wherein said packet header information includes time stamp information generated by converting time stamp information in the code strings into a predetermined format.

16. The moving image coding apparatus as claimed in claim 13, wherein said frame header information includes any information of a time code, a VPO coding mode, intra DC VLC table change information, motion vector range information contained in the VOP header.

17. A moving image coding apparatus, comprising:
a plurality of coders configured to perform a function for (1) dividing an input moving image signal into a plurality of frame image signals, (2) dividing each of the frame image signals into a plurality of area image signals, (3) compression coding each area image signal into an area image code string, and (4) adding a frame header information indicating a compression coding mode of the frame to the area image code string; and
a plurality of packetizators configured to perform a function for collecting a plurality of area image code strings to which the frame header information has been added, and for adding packet header information to the collected plurality of area image code strings.

18. The moving image coding apparatus as claimed in claim 17, wherein said packetizator includes a multiplexer comprising:
a plurality of access unit generators configured to perform a function for separating the code strings into predetermined units and generating the access units from the plurality of access unit generators and generating a sync layer packet.

19. The moving image coding apparatus as claimed in claim 17, wherein said frame header information includes any information of a time code, a VPO coding mode, intra DC VLC table change information, motion vector range information contained in the VOP header.

20. A moving image coding apparatus, comprising:
a first coding device configured to (1) divide an input moving image signal into a plurality of frame image signals, (2) divide each of the frame image signals into a plurality of area image signals, (3) compression code each area image signal into an area image code string, and (4) add frame header information indicating a compression coding mode of the frame to each area image code string; and
a second coding device configured to collect a plurality of area image code strings to which the frame header information has been added, and to add packet header information to the collected plurality of area image code strings.

21. The moving image coding apparatus as claimed in claim 20, wherein said second coding device includes a multiplexer comprising:
a plurality of access unit generators configured to separate the area image code strings into predetermined units and to generate access units from the plurality of access unit generators and to generate a sync layer packet.

* * * * *